United States Patent

Takahashi et al.

[11] Patent Number: 5,822,154
[45] Date of Patent: Oct. 13, 1998

[54] MAGNETIC HEAD APPARATUS WITH RESIN PORTIONS SANDWICHING AN ELASTIC MEMBER TO FORM ELASTIC DISPLACING PORTIONS AND METHOD OF MAKING THE SAME

[75] Inventors: Tomoyuki Takahashi; Hideo Tanaka, both of Miyagi, Japan

[73] Assignee: Sony Corporation, Tokyo, Japan

[21] Appl. No.: 846,528

[22] Filed: Apr. 29, 1997

Related U.S. Application Data

[63] Continuation of Ser. No. 565,082, Nov. 30, 1995, abandoned, which is a continuation of Ser. No. 293,138, Aug. 19, 1994, abandoned.

[30] Foreign Application Priority Data

Aug. 23, 1993 [JP] Japan ................................ 5-229486

[51] Int. Cl.$^6$ ........................................................... G11B 5/58
[52] U.S. Cl. .................................................................. 360/104
[58] Field of Search ............................. 369/13; 360/105, 360/104, 103, 107, 106

[56] References Cited

U.S. PATENT DOCUMENTS

| | | | |
|---|---|---|---|
| 5,006,946 | 4/1991 | Matsuzaki | 360/104 |
| 5,115,363 | 5/1992 | Khan et al. | 360/104 |
| 5,124,864 | 6/1992 | Matsuzaki | 360/104 |
| 5,136,445 | 8/1992 | Zak | 360/103 |
| 5,339,208 | 8/1994 | Yumura et al. | 360/104 |

FOREIGN PATENT DOCUMENTS

| | | |
|---|---|---|
| 0 084 123 A1 | 7/1983 | European Pat. Off. . |
| 0 324 966 A1 | 7/1989 | European Pat. Off. . |
| 0 343 755 A2 | 11/1989 | European Pat. Off. . |
| 2 059 628 | 9/1972 | Germany . |
| 56-83870 | 7/1981 | Japan ................................ 360/104 |
| 59-213066 | 12/1984 | Japan ................................ 360/104 |
| 61-061277 | 3/1986 | Japan . |
| 61-296580 | 12/1986 | Japan ................................ 360/104 |
| 62-6473 | 1/1987 | Japan ................................ 360/104 |
| 63-1006115 | 5/1988 | Japan ................................ 360/104 |
| 5081726 | 4/1993 | Japan . |
| 5128613 | 5/1993 | Japan . |

*Primary Examiner*—Stuart S. Levy
*Assistant Examiner*—Kevin M. Watkins
*Attorney, Agent, or Firm*—Limbach & Limbach L.L.P.

[57] ABSTRACT

A magnetic head apparatus for a magneto-optical recording medium recording and/or reproducing apparatus includes a head body and an arm-shaped support mechanism. The head body includes a magnetic head unit for generating a perpendicular magnetic field, and a contact-slide portion to which the magnetic head unit is secured and which is slid along the magneto-optical recording medium in contact with the surface of the magneto-optical recording medium. The arm support mechanism to which the head body is secured is movable in such a direction that the magnetic head unit is contacted with or away from the magneto-optical recording medium. The arm-shaped support mechanism has an arm portion, a fixed portion and first and second elastic displacing portions. The head body is secured to one end side of the arm portion through the first elastic displacing portion. The fixed portion has one end secured to the fixed member and the other end portion has one end secured to the fixed member and the other end which is linked to the other end of the arm portion through the second elastic displacing portion. The arm-shaped support mechanism is disposed so as to sandwich the central axial line of the support mechanism, and it comprises a pair of plate-shaped elastic members constituting the first and second elastic displacing portions, and a resin portion which is provided at both sides of at least one of the elastic members and forms the arm portion and the fixed portion.

1 Claim, 17 Drawing Sheets

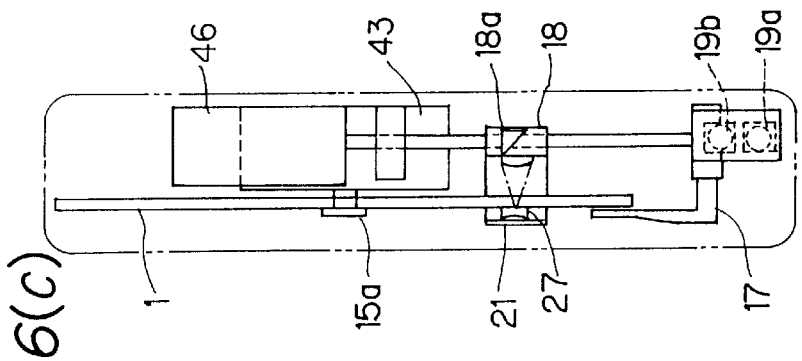
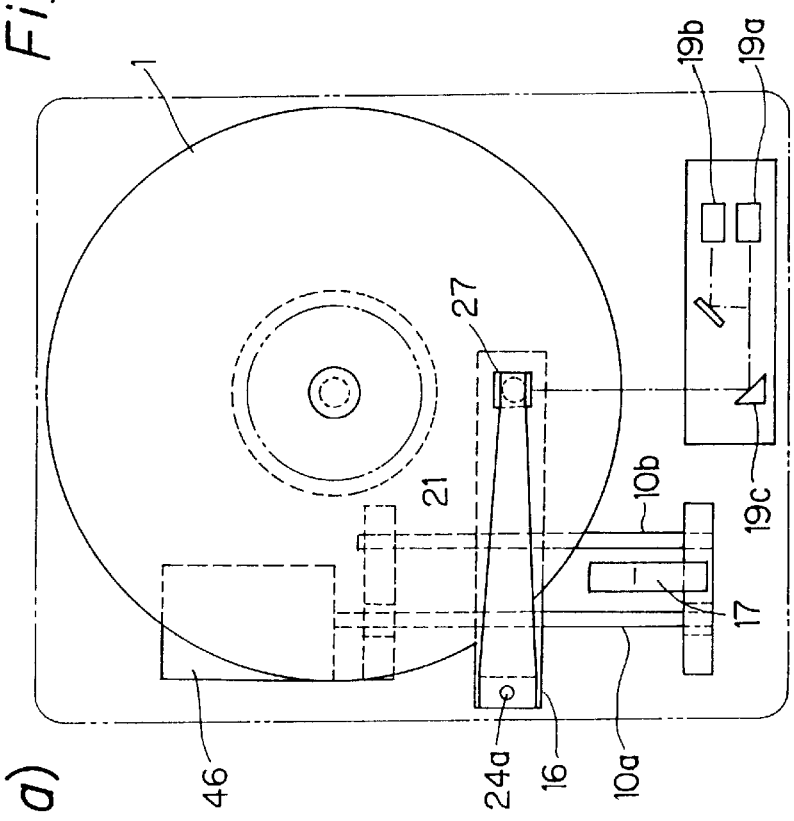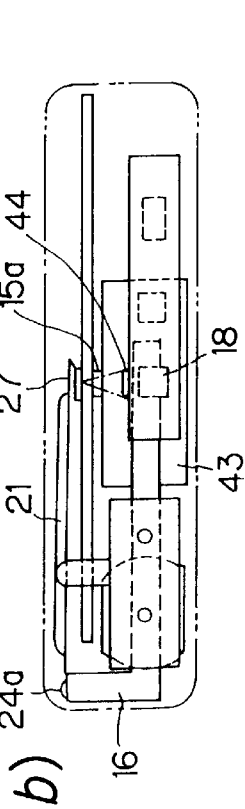

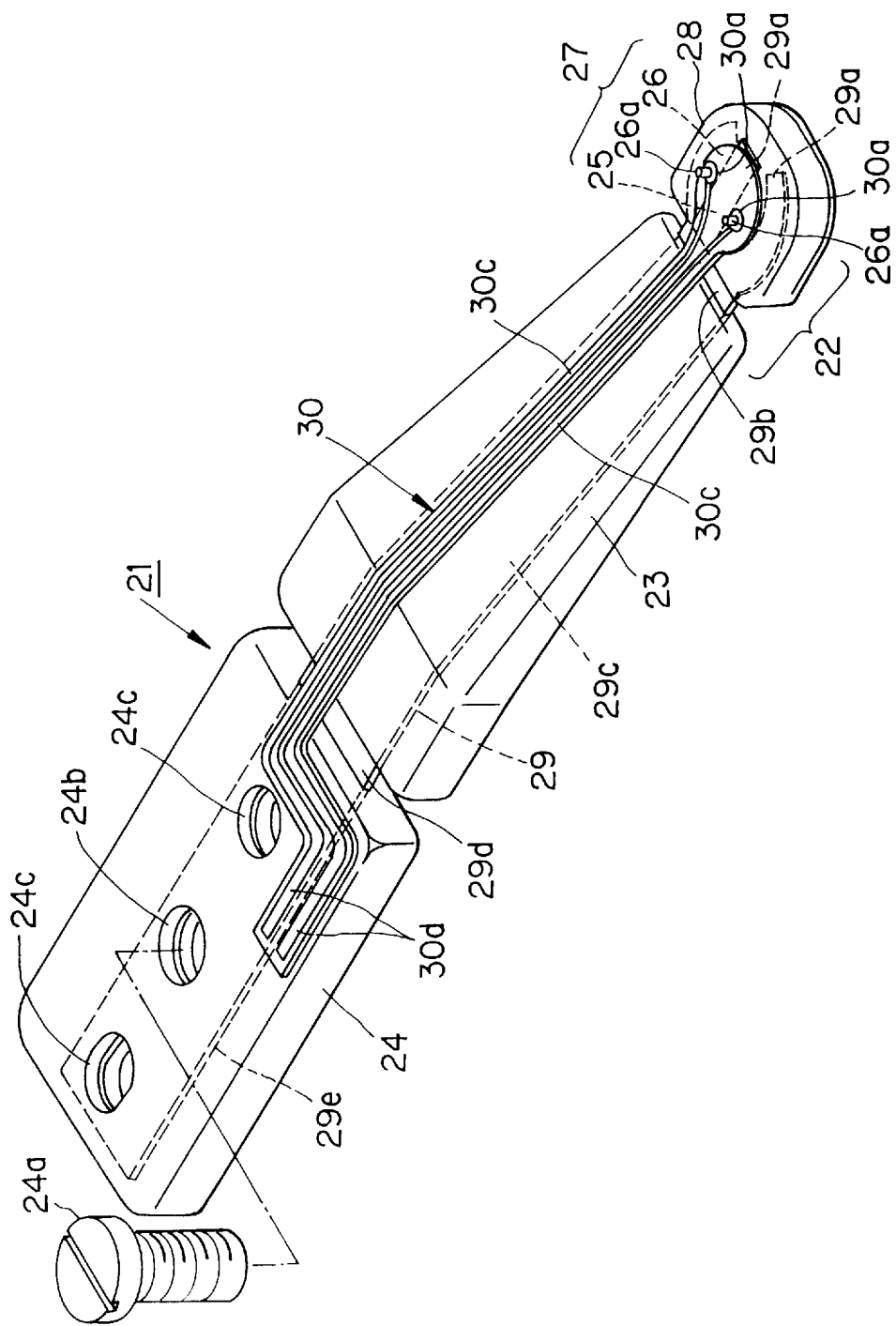

MAGNETIC HEAD APPARATUS WITH RESIN PORTIONS SANDWICHING AN ELASTIC MEMBER TO FORM ELASTIC DISPLACING PORTIONS AND METHOD OF MAKING THE SAME

This is a continuation of co-pending application No. 08/565,082 filed on Nov. 30, 1995 now abandoned, which is a continuation of Ser. No. 08/293,138 filed on Aug. 19, 1994 now abandoned.

BACKGROUND OF THE INVENTION

1. Field of the Invention

This invention relates to a magnetic head apparatus and a method of manufacturing the magnetic head, and particularly to a magnetic head which is slid along the surface of a recording medium in contact with the recording medium.

2. Related Art of the Invention

A magneto-optical disc has been known as one of so-called writable optical discs capable of performing write-in, deleting and read-out operations of information with a light beam.

FIG. 1 shows the construction of such a magneto-optical disc. As shown in FIG. 1, the magneto-optical disc 1 includes a transparent substrate 2, a magneto-optical recording layer 3 formed of a perpendicular-magnetization film which is formed on the transparent substrate 2, a reflection film 4 formed of a metal thin film such as an aluminum film which is laminated on the magneto-optical recording layer 3, and a protection film 5 formed of a resin which is cured by ultraviolet rays or the like which is formed on the reflection film 4.

A magnetic filed modulation mode. An optical modulation mode, etc. have been known as a recording mode for magneto-optical discs.

In the magnetic-field modulation mode, an over-writing operation in which new signals are over-written on old signals can be performed. In a magneto-optical recording and/or reproducing apparatus using the magnetic-field modulation mode, as shown in FIG. 2, an optical pickup (not shown) for irradiating a light beam 6 onto the magneto-optical disc 1 and a magnetic-field generating means, that is, a magnetic head 7 which is moved in synchronism with a light beam spot are disposed such that the magneto-optical disc 1 is sandwiched between the optical pickup and the magnetic head 7. More particularly, the optical pickup is disposed to face the substrate 2 through an objective lens and the magnetic head 7 is disposed to face the protection film 5. When an information signal is recorded on the magneto-optical disc, the direction of current flowing in the magnetic head 7 is varied in accordance with the information signal to be recorded to change the direction of generated perpendicular magnetic field.

The magneto-optical disc 1 is rotated around its center portion at a constant linear velocity or at a constant angular velocity in a recording or reproducing operation.

By supplying a perpendicular magnetic field corresponding to a recording signal to a light beam spot 6a and its periphery, a portion 1A which is required to be rewritten is heated to a temperature more than its Curie temperature by the light beam spot 6a, whereby the portion 1A is demagnetized. Thereafter, the magneto-optical disc 1 and the light beam spot 6a are moved relatively to each other by rotation of the magneto-optical disc 1, and the portion 1A is cooled to a temperature less than the Curie temperature. At this time, the portion 1A which is required to be rewritten is magnetized in a perpendicular magnetization direction, whereby information is recorded on the magneto-optical disc.

The magneto-optical disc 1 is a non-contact type medium, and thus the magnetic head 7 is disposed away from the disc 1 at a sufficient interval d0 (for example, 0.2 mm). The magneto-optical disc 1 is displaced in a vertical direction of FIG. 2 due to warp of the disc itself when it rotates, and thus the above distance is set to such a value that the magneto-optical disc 1 and the magnetic head 7 are not contacted with each other.

Since the magneto-optical disc is subjected to a recording operation in a non-contact state as described above, the magnetic head 7 for a magneto-optical recording is provided with an electromagnetic servo mechanism away from the disc 1 so as to follow the fluctuation of the surface of the disc 1 which is induced due to inclination, unevenness of thickness, etc. of the disc 1 when the disc is rotated. Therefore, in a recording and reproducing apparatus using a non-contact system for the magneto-optical disc, restriction is imposed on reduction in power consumption, miniaturization of the apparatus, particularly the thickness of the apparatus, etc.

Therefore, it may be considered that the magnetic head is slid in contact with the magneto-optical disc. For example, as shown in FIG. 3, a contact-sliding type magnetic head 11 includes a head element 14 comprising a central magnetic pole core 12A of ferrite core 12 and a coil 13 which is wound around the magnetic pole core 12A, and a contact-slide portion 14a which is more flexible than the core material and is located around the head element 14.

In the contact-slide type magnetic head 11, the contact-slide portion 14a is slid in contact with the surface of the disc 1 while the central magnetic pole core 12A faces the disc 1 at a minute interval of d1 without being directly contacted with the disc 1. Therefore, the protection film 5 of the disc 1 is prevented from being damaged.

Further, a contact system in which the magnetic head 11 is slid along the surface of the magneto-optical disc 1 in contact with the disc 1 is adopted, so that a simple mechanism of merely securing the magnetic head 11 to a head arm through a support elastic member of the magnetic head 11 can be used. Therefore, a bulky electrode servo mechanism which has been conventionally used may be omitted. As a result, as compared with the non-contact system, the magnetic head 11 can be disposed nearer to the disc 1, so that magnetic field to be applied to the disc 1 is stronger and a power consumption in a recording operation can be reduced.

The magnetic head as described above is liable to be separated form the disc 1 upon application of external impact.

FIG. 4 shows a model of a support mechanism of the magnetic head 11 as described above. In this model, the magnetic head 11 is supported through a spring member 817 to a fixed member 818, and the magnetic head 11 is contacted with the disc surface 1a under a spring pressure.

It is now assumed that an acceleration a is applied to the fixed member 818 and the disc 1 by an external force. In this case, when the acceleration a directs downwardly, the magnetic head 11 is kept in its current state due to its inertia, so that the magnetic head 11 is separated from the disc 1. That is, as being understandable in FIG. 4, a force F which is equal to the product of the acceleration a and the mass of the magnetic head 11 occurs upwardly. Accordingly, the magnetic head 11 would be separated from the disc 1 if the spring pressure (force) exceeding the above external force is applied to the magnetic head 11 in the opposite direction to that of the external force.

In view of the foregoing, there has been adopted a method of applying to the magnetic head 11 a load force exceeding a force caused by an acceleration a which is expected from an application of an external impact.

However, a large load force causes the contact-sliding resistance to be increased, and thus more greatly damages the disc 1. At the same time, it increases the load to be applied to a spindle motor for rotationally driving the disc. In addition, abrasion of the contact-slide portion 14a is not negligible.

Accordingly, the spring force to be applied to the magnetic head 11 is required to be durable against an acceleration (larger than an external force) which is expected from an external impact, however, for the purpose of reducing the contact-sliding resistance, the spring force is preferably as small as possible in a range whose minimum value exceeds the above external force. However, in order to meet this requirement, the structure of the magnetic head supporter must be more complicated, and a manufacturing cost becomes higher.

SUMMARY OF THE INVENTION

It is, therefore, an object of the present invention to provide a magnetic head apparatus which solves the above-mentioned problem.

It is another object of the present invention to provide a manufacturing method of a magnetic head apparatus which solves the above-mentioned problem.

According to the present invention, there is provided a magnetic head apparatus including a head body and a support member. The head body includes a head element and a contact-slide portion which is slid in contact with a recording medium while supporting the head element. The support member supports the head body, and has first and second support portions, and first and second elastic displacing portions. The head body is secured through the first elastic displacing portion to one end side of the first support portion. The second support portion has one end which is secured to the fixed end, and the other end which is linked to the first support portion through the second elastic displacing portion. The support member comprises at least one elastic member forming the first and second elastic displacing portions, and a resin portion which is integrally formed with the elastic member.

According to the present invention, there is provided a magnetic head apparatus including a head body and an arm-shaped support member. The head body includes a magnetic head element, and a contact-slide portion which is slid in contact with the recording medium while supporting the magnetic head element. The arm-shaped support member supports the head body, and has first and second support portions, and first and second elastic displacing portions. The head body is secured through the first elastic displacing portion to one end side of the first support portion. The second support portion has one end which is secured to the fixed end, and the other end which is linked to the other end of the first support portion through the second elastic displacing portion. The support member comprises at least one plate-shaped elastic member forming the first and second elastic displacing portions, and a resin portion which is integrally formed with the elastic member.

According to the present invention, there is provided a magnetic head apparatus including a head body and an arm-shaped support member. The head body includes a magnetic head element, and a contact-slide portion which is slid in contact with the recording medium while supporting the magnetic head element. The arm-shaped support member supports the head body, and has first and second support portions and first and second elastic displacing portions. The head body is secured through the first elastic displacing portion to one end side of the first support portion. The second support portion has one end secured to the fixed end, and the other end which is linked to the other end of the first support portion through the second elastic displacing portion. The support member comprises a pair of plate-shaped elastic members which are disposed so as to sandwich the central axis of the support member therebetween and form the first and second elastic displacing portion, and a resin portion which is provided at at least one surface side of each of the elastic members to form the first and second support portions.

According to the present invention, there is provided a manufacturing method of a magnetic head apparatus having at least one plate-shaped elastic member forming the first and second elastic displacing portions, a head body portion to which a magnetic head element is secured, and first and second support portions, these portions being formed of resin. The head body portion and the first support portion are linked to each other through the first elastic displacing portion. The first and second support portions are linked to each other through the second elastic displacing portion. In the manufacturing method, in a state where the elastic member is inserted into plural cavities for forming the first and second support portions, portions serving as the first and second elastic displacing portions are sandwiched by upper and lower molds, and resin is injected into the plural cavities so that the head body and the first and second support portions are formed integrally with the elastic member so as to sandwich the elastic member therebetween from the upper and lower sides in the direction of the thickness of the elastic portion.

According to this invention, the elastic displacing portion is constructed by the first and second elastic displacing portions, and the contact-sliding of the head body along the recording medium is performed by the first elastic displacing portion while the second elastic displacing portion is used for minute vibration of the recording medium, the contact pressure between the head body and the recording medium can be reduced, and thus the recording medium can be prevented from being damaged. Further, the contact-sliding of the head body along the surface of the recording medium can be surely performed, so that the recording and/or reproducing operation can be excellently performed.

Further, according to this invention, the support member for supporting the head body is constructed by the elastic member constituting the first and second elastic displacing portions and the resin formed integrally with the elastic member, so that the head device can be light weight, and rigidity can be ensured.

Still further, according to this invention, the support member for supporting the head body is constructed by the elastic member constituting the first and second elastic displacing portions and the resin formed integrally with the elastic member, so that the construction can be simplified, and the manufacturing process can be easily performed.

BRIEF DESCRIPTION OF THE DRAWINGS

FIGS. 6A to 6C show the construction of the magneto-optical disc recording and/or reproducing apparatus, where FIG. 6A is a plane view of the magneto-optical disc recording and/or reproducing apparatus, FIG. 6B is a front view of the magneto-optical disc recording and/or reproducing apparatus and FIG. 6C is a right side view of the magneto-optical disc recording and/or reproducing apparatus;

FIG. 7 is a perspective view showing the construction of a magnetic head apparatus according to a first embodiment of this invention;

BRIEF DESCRIPTION OF THE DRAWINGS

The magnetic head apparatus according to this invention and the manufacturing method therefor will be described in detail with reference to the accompanying drawings.

Figure 1:
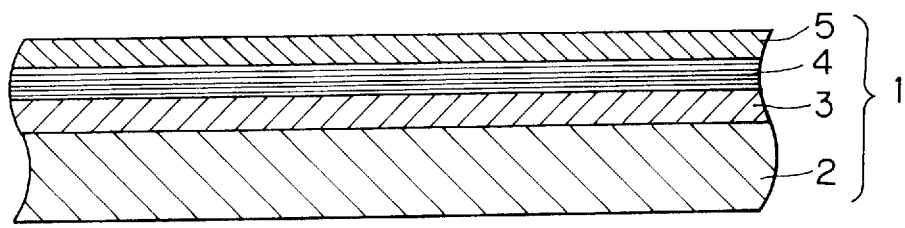
FIG. 1 is a cross-sectional view of a magneto-optical disc.
Figure 2:
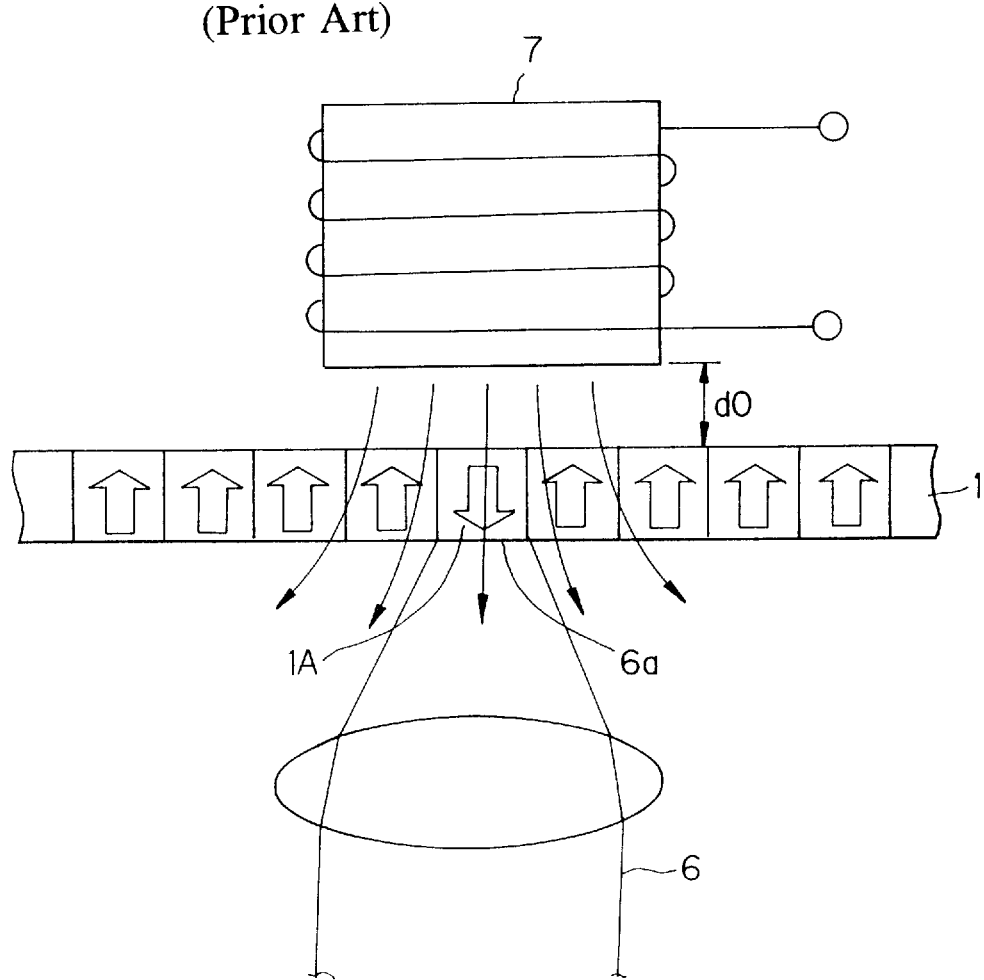
FIG. 2 is a diagram showing the principle of recording information on a magneto-optical disc in a magnetic-field modulation system.
Figure 3:
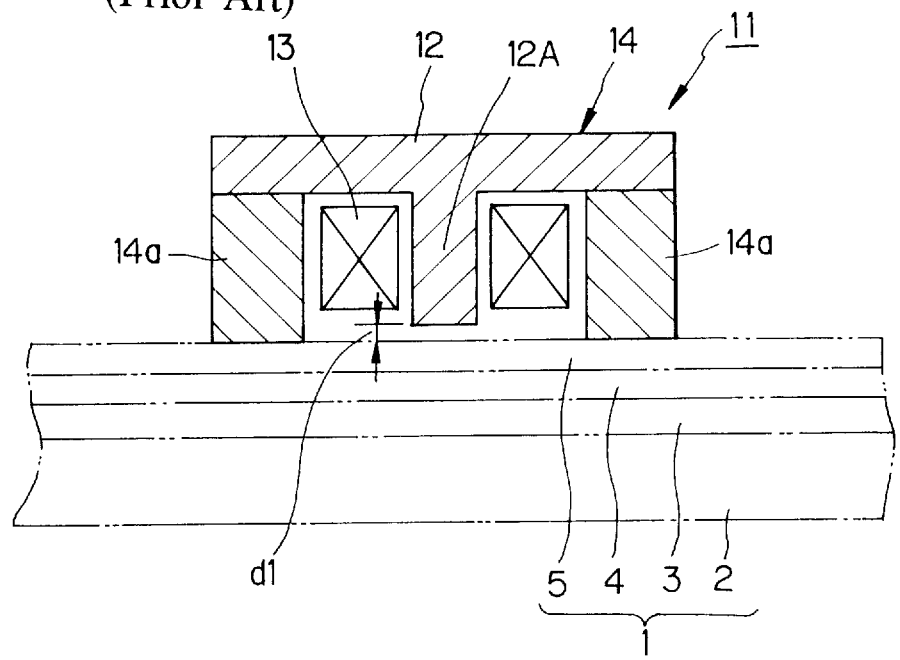
FIG. 3 is a substantially cross-sectional view of a magnetic head.
Figure 4:
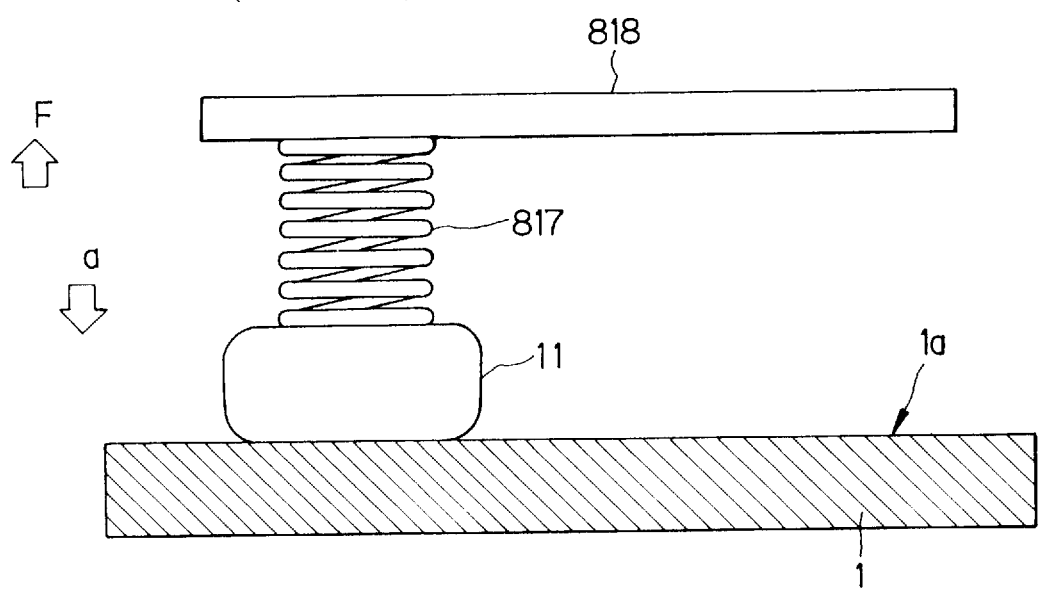
FIG. 4 is a diagram showing a support mechanism for the magnetic head.
Figure 5:
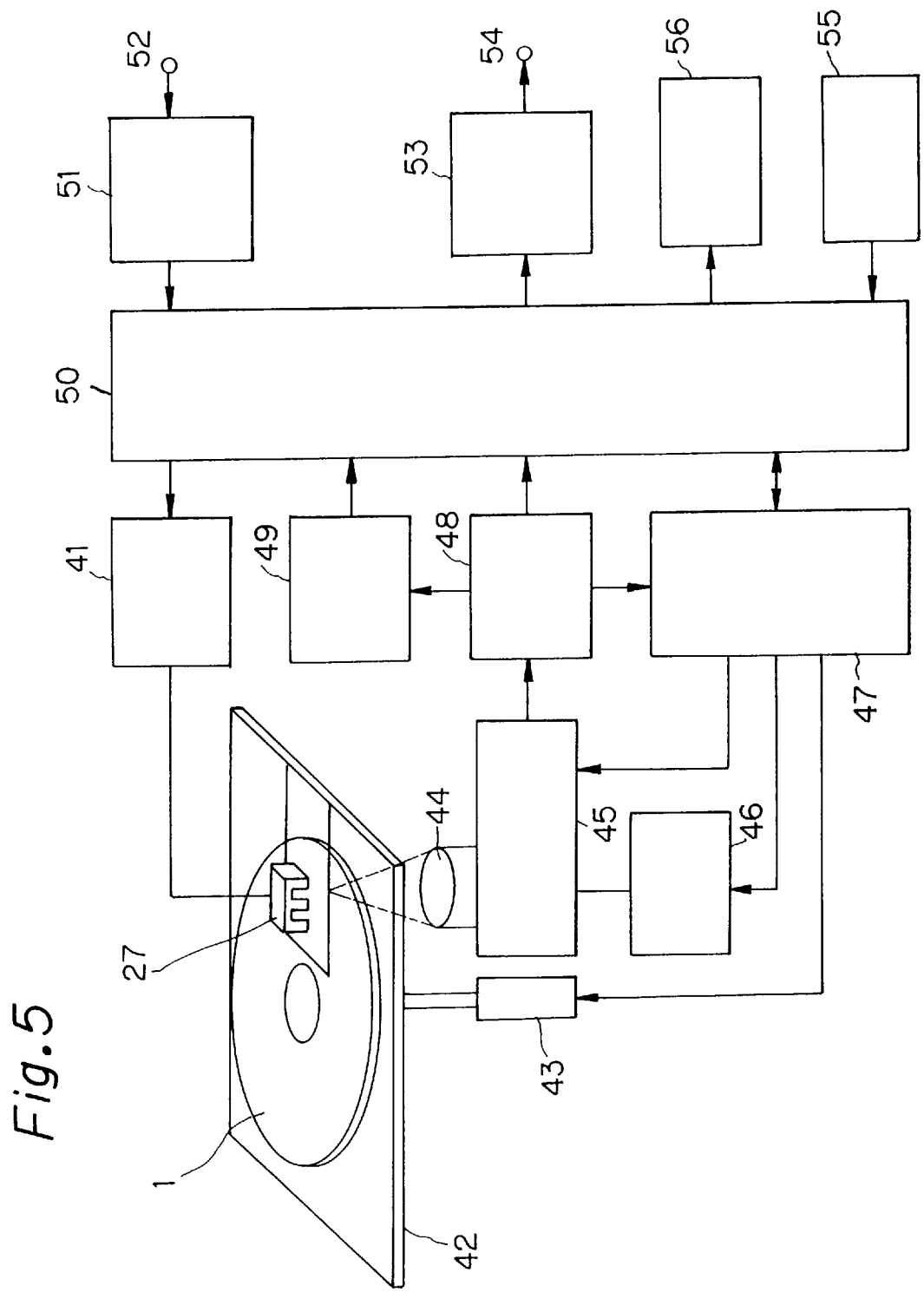
FIG. 5 is a block diagram showing the construction of a magneto-optical disc recording and/or reproducing apparatus.

First, a magneto-optical disc recording and/or reproducing apparatus in which the magnetic head apparatus of this invention is used will be described. FIG. 5 is a block diagram showing the construction of the recording and/or reproducing apparatus using the magneto-optical disc shown in FIG. 1.

The magneto-optical disc 1 is accommodated in a disc cartridge 42. In the magneto-optical disc 1, a protection film is formed of material having a smoothly sliding property, or it is covered with a film having a smoothly sliding property. The disc cartridge 42 has an opening portion through which information signals are recorded onto the magneto-optical disc 1 by an optical pickup (not shown) as described later and the magnetic head or information signals recorded on the magneto-optical disc 1 are read out by the optical pickup. Further, the disc cartridge 42 is provided with a shutter (not shown) for opening and closing the opening portion. The shutter opens the opening portion when the disc cartridge 42 is loaded into the main body of the apparatus, and closes the opening portion when the disc cartridge is unloaded from the apparatus body. The magneto-optical disc 1 accommodated in the disc cartridge 42 is rotationally driven by a spindle motor 43. The magneto-optical disc 1 is rotationally driven at a constant linear velocity or at a constant angular velocity.

A light beam emitted from the optical pickup 45 is irradiated onto the magneto-optical disc 1 rotated by the spindle motor 43 from the substrate side of the disc. In addition, the perpendicular magnetic field emitted from the magnetic head 27 is applied onto the magneto-optical disc from the protection film side of the magneto-optical disc 1 when information signals are recorded on the magneto-optical disc 1. The optical pickup 45 contains a light source, a photodetector and an optical system. The light beam emitted from the light source is irradiated onto the magneto-optical disc 1 while converged by an objective lens 44. The light beam irradiated onto the magneto-optical disc 1 is reflected from a recording film and/or reflection film, and then incident into the optical pickup 45 through the objective lens 44 again. The incident light beam is separated from he light beam emitted from the light source, and guided to the photodetector. The objective lines 44 is moved at least in a focusing direction by an actuator (not shown) provided to the optical pickup 45 so that a focus error is equal to zero. For example, an electromagnetic actuator is used as the actuator. The optical pickup 44 is linked to an arm-shaped head supporter (not shown) to which the magnetic head 27 is secured, and it is fed in a radial direction of the magneto-optical disc 1 together with the magnetic head 27 by a feeding motor 46. The construction of the magnetic head 27 will be described later.

The output signal from the photodetector of the optical pickup 44 is supplied to an RF amplifier 48. The RF amplifier 48 generates an RF signal on the basis of the output signal from the photodetector, and supplies the generated RF signal to a control circuit group as described later. The RF amplifier 48 generates error signals such as a focus error signal, a tracking error signal, etc. in the basis of the output signal from the photodetector, and supplies these signals to a servo control circuit 47. The servo control circuit 47 generates respective servo signals such as a focus servo signal, a tracking servo signal and a spindle servo signal on the basis of the supplied error signals, and supplies these signals to the actuator, the spindle motor 43, etc. of the optical pickup 45. Through this operation, various servo operations such as a focus servo, a tracking servo, a spindle servo, etc. are performed. On the basis of the tracking error signal, the servo control circuit 47 generates a feeding signal, and supplies it to the feeding motor 46. The optical pickup 45 and the magnetic head 27 is fed in a radial direction of the disc along a track on the magneto-optical disc 1 in a recording or reproducing operation. The RF amplifier 48 extracts an address signal which is beforehand recorded on the magneto-optical disc 1, and supplies it to an address decoder 49. The address decoder 49 decodes the supplied address signal, and supplies it as address data to the control circuit group as described later.

The control circuit group 50 includes a decoder unit for subjecting the RF signal supplied from the RF amplifier 48 to prescribed decode processing, for example, demodulation processing such as a demodulation processing of EFM, a decoding processing of error correction codes, etc. an encoder unit for subjecting the input digital signal to prescribed encode processing, for example, coding processing such as a coding processing of EFM, a coding processing of error correction codes, etc., and a control unit for controlling the operation of each element of the recording and/or reproducing apparatus. The control unit of the control circuit group 50 is connected to an operation unit 55 and a display unit 56. The operation unit 55 comprises plural operation keys, and start and stop of a recording operation of information signals onto the magneto-optical disc 1, start and stop of a reproducing operation of information signals recorded on the magneto-optical disc 1, selection of musical pieces, etc. are input to the control unit by the user. On the basis of an input signal from the operation unit 55, the control unit generates various kinds of control signals to perform the start and stop of the recording or reproducing operation, the selection of the musical pieces, etc. On the display unit 56 is displayed read-out information which is recorded in a list area on the magneto-optical disc 1, and also displayed are the names of musical pieces and time information such as a recording lapse time, a reproduction lapse time, etc.

Analog signals such as analog audio signals which are input as information signals from an input terminal 52 are supplied to an A/D converter 51, and converted to a digital signal of 16 bit. The digital signal from the A/D converter 51 is supplied to the encoder portion of the control circuit group 50, and subjected. to the encode processing to be converted to recording data. Thereafter, the recording data are supplied to the magnetic head 27. The perpendicular magnetic field on the basis of the recording data is supplied to the magneto-optical disc 1 by the magnetic head 27. At this time, the light beam having a recording level power which is emitted from the optical pickup 45 is irradiated onto the magneto-optical disc from the substrate side of the magneto-optical disc 1.

The digital signal output from the decoder unit of the control circuit group 50 is supplied to a D/A converter 53, and converted to an analog signal by the D/A converter 53. The analog signal output from the D/A converter 53 is supplied from an output terminal 54 to external equipment, for example, an audio amplifier or the like.

When information signals are recorded on the magneto-optical disc 1, the optical pickup 45 and the magnetic head 27 are first moved so as to face a recording start point on the disc by the feeding motor 46. After these elements are moved to the positions corresponding to the recording start point, a light beam having an output level which is required for the recording operation is emitted from the optical pickup 45 to irradiate the substrate side of the disc 1, and a perpendicular magnetic field corresponding to the recording data is applied from the magnetic head 27. As described above, the recording data are obtained as follows. The analog signal serving as the information signal input from the input terminal 52 is converted to the digital signal by the A/D converter 51, and the digital signal is supplied to the encoder unit of the control circuit group 50 to be subjected to the encode processing in the encoder unit. The recording data thus obtained is supplied through a magnetic head driving circuit 41 to the magnetic head 27. At this time, the recording film of the magneto-optical disc 1 is heated to its curie temperature or more by the light beam irradiated from the optical pickup 45, so that the recording film is demagnetized, and magnetized in accordance with the direction of the perpendicular magnetic field supplied from the magnetic head 27. The magneto-optical disc 1 is rotated by the spindle motor 43, and thus the light beam emitted from the optical pickup 45 and the recording film on the magneto-optical disc are moved relatively to each other. Therefore, the recording film which is temporarily heated to the Curie temperature or more by the light beam irradiated from the pickup 45 is cooled to a temperature less than the Curie temperature through the relative movement between the light beam and the recording film. At this time, the recording film is magnetized in accordance with the direction of the perpendicular magnetic field applied from the magnetic head 27 to the magneto-optical disc 1, that is, in accordance with the polarity of any one of S and N poles. As a result, the recording data are recorded on the magneto-optical disc 1.

When the information signal recorded on the magneto-optical disc 1 is reproduced, the optical pickup 45 is moved to the position corresponding to a reproduction start point on the magneto-optical disc 1 by driving the feeding motor 46. At this time, the magnetic head 27 is also moved in the radial direction of the magneto-optical disc 1, however, it makes no contribution to the reproduction. After the optical pickup 45 reaches the reproduction start point, the optical pickup 45 irradiates a light beam having an output level required for the reproduction from the magneto-optical disc 1. The output level required for the reproduction is sufficiently lower than an output level required for the recording, and the recording film of the magneto-optical disc 1 cannot be demagnetized by this output level. The light beam emitted from the optical pickup 45 is transmitted through the transparent substrate of the magneto-optical disc 1 by the objective lens 44, and focused on the recording film. The light beam which is focused by the objective lens 44 is reflected from the recording film and/or the reflection film, and guided through the objective lens 44 into the optical pickup 45. The polarization of the light beam which is reflected form the magneto-optical disc 1 (hereinafter referred to as "reflected light beam") is rotated in accordance with the magnetization direction of the recording film of the magneto-optical disc 1. In other words, the polarization of the light beam is rotated due to a magnetic Kerr effect. The reflected light beam which is incident to the optical pickup 45 again is separated from the light beam emitted from the light source, and guided to the photodetector. The photodetector converts information on rotation of the polarization of the reflected light beam due to the Kerr effect into an electrical signal, and outputs it as an output signal. The output signal from the photodetector is supplied to the RF amplifier 48 to generate an RF signal, error signals such as a focus error signal, a tracking error signal, etc. The RF signal output from the RF amplifier 48 is supplied to the decoder unit of the control circuit group 50 to be subjected to the demodulation processing. The digital signal output from the decoder unit of the control circuit group 50 is supplied to the D/A converter 53, converted to an analog signal in the D/A converter 53, and then output from the output terminal 54.

The recording operation of the information signal onto the magneto-optical disc 1 and the reproducing operation of the information signal from the magneto-optical disc 1 are started or stopped by manipulation of the operation keys of the operation unit 55, the information signal recorded on the magneto-optical disc 1 is reproduced from a desired position on the magneto-optical disc 1 or the information signal is recorded on the magneto-optical disc 1. Further, at the first time when the recording operation or reproducing operation of the information signal is started or at the time when the magneto-optical disc 1 is loaded into the recording and/or reproducing apparatus, information recorded at a list area which is provided at the inner peripheral side of a recording area on the magneto-optical disc 1 is read out by the optical pickup 45, and stored in a RAM area of the control unit of the control circuit group 50. The list information stored in the control unit is used for an access operation of the optical pickup 45 in the reproducing operation, a display operation of time information, a music number, etc. on the display 56.

The construction of the recording and/or reproducing apparatus using the magneto-optical disc will be described in more detail with reference to FIGS. 6A to 6C. FIG. 6A is a plan view of the recording and/or reproducing apparatus and FIG. 6C is a right side view of the recording and/or reproducing apparatus.

The optical pickup 45 comprises a movable portion 18 and a fixed portion 19. The movable portion 18 is fed in a radial direction of the magneto-optical disc 1 along a pair of guide members 10*a* and 10*b* by the feeding motor 46. One of the guide members 10*a* and 10*b* is rotationally driven by the feeding motor 46, and it comprises a lead screw which is engaged with the movable portion 18 of the optical pickup 45. When the one guide member 10 is rotated, the movable portion 18 of the optical pickup 45 is fed in the radial direction of the magneto-optical disc 1. The movable portion 18 of the optical pickup 45 is provided with a focus actuator comprising an electromagnetic actuator. The objective lens 44 is driven in the focusing direction by the focus actuator. A bent mirror 18*a* is disposed at the lower side of the objective lens 44 on the optical axis of the objective lens 44 of the movable portion 18.

The fixed portion 19 includes a light source 19*a*, a photodetector 19*b* and plural mirrors. The light beam emitted from the light source is deflected by the plural mirrors, output from an opening portion (not shown) of the fixed portion 19 and then guided to the bent mirror 18*a* through an opening portion (not shown) of the movable portion 18. The light beam emitted from the light source 19*a* is deflected from the mirror 18*a* by 90°, guided by the objective lens 44 and then focused onto the recording film of the magneto-optical disc 1 by the objective lens 44. The reflected light beam from the magneto-optical disc 1 is passed through the objective lens 44 and the mirror 18*a* and incident through the opening portion of the fixed portion 19 into the fixed portion 19. Thereafter, the incident light beam is deflected by the plural mirrors, separated from the light beam emitted from the light source 19*a* and then guided into the photodetector 19*b*. The mirror 19*c* of the plural mirrors of the fixed portion 19 is driven by the electromagnetic actuator which is supplied with a tracking servo signal generated on the basis of the tracking error signal, whereby the tracking servo is performed.

The magnetic head 27 is secured to the tip side of the head supporter 21 so that the center of the light beam which is focused by the objective lens 44 of the optical pickup 45 is coincident with the center of the magnetic field of the magnetic head 27. The head supporter 21 is linked to the movable portion 18 of the optical pickup 45 by the link arm 16 such that it is designed in a substantially U-shape in section. The link arm 16 is secured to the movable portion 18 through a screw 24*a*.

As described above, the feeding control in the radial direction of the magneto-optical disc 1 of the optical pickup 45 and the magnetic head 27 is performed by supplying the feeding motor 46 with a low-frequency band component of the tracking error signal generated by the RF amplifier 48 to drive the feeding motor 46. The high-frequency band component of the tracking error signal generated by the RF amplifier 48 is supplied to the actuator for driving the mirror 19*c* of the optical pickup 45 to perform the tracking servo. Through this operation, the size of the magnetic flux generated in the magnetic head 27 is set to, for example, 70 $\mu$m $\Phi$ so that the magnetic field required for the recording on the magneto-optical disc 1, for example, the perpendicular magnetic field of 150 Oe is applied to the magneto-optical disc 1 even when the position of the light beam irradiated from the optical pickup 45 varies. Further, 50 $\mu$m $\Phi$ is added to the above magnetic flux size as a compensation for the positional deviation between the centers of the light beam emitted form the optical pickup 45 and the magnetic field generated from the magnetic head 27, thereby setting the magnetic flux size (dimension) to 70+50=120 $\mu$m $\Phi$, for example.

Before the recording operation or reproducing operation for the magneto-optical disc 1 is completed and thus the rotation of the magneto-optical disc 1 is stopped, the feeding motor 46 is supplied with the control signal from the control unit of the control circuit group 50, so that the optical pickup 45 and the magnetic head 27 are fed to a position which is away from the outer peripheral end of the magneto-optical disc 1. At this time, the head supporter 21 is engaged with a lifter 17 when the optical pickup 45 and the magnetic head 27 are moved toward the outer peripheral side of the magneto-optical disc 1, so that the head supporter 21 is lifted in such a direction that the magnetic head 27 is moved away from the surface of the magneto-optical disc 1. A tapered surface is formed at the free end side of the lifter 17, and a flat surface is formed at the base end side so as to be continuous to the tapered surface. The head supporter 21 is moved on the lifter 17 along the tapered surfaced of the lifter 17. At the time when the movement of the optical pickup 45 and the magnetic head 27 is terminated, the head supporter 21 is positioned on the flat surface of the lifter 17, and the magnetic head 27 is kept away from the magneto-optical disc 1. The lift amount of the magnetic head 27, that is, the interval distance between the magneto-optical disc 1 and the magnetic head 27 is set to such a distance that the magnetic head 27 is sufficiently away from the magneto-optical disc 1 and there is no possibility that the magnetic head 27 is contact with the magneto-optical disc 1, for example, about 0.2 mm.

When the recording or reproducing operation for the magneto-optical disc 1 is started, the optical pickup 45 and the magnetic head 27 are moved in the inner peripheral direction of the magneto-optical disc 1. At this time, the head supporter 21 is moved from the flat surface of the lifter 17 to the tapered surface, so that the magnetic head 27 is gradually downwardly moved toward the magneto-optical disc 1. When the movement of the optical pickup 45 and the magnetic head 27 in the inner peripheral side of the magneto-optical disc 1 is completed, the magnetic head 27 is contacted with the magneto-optical disc 1.

Next, the construction of the magnetic head apparatus according to the first embodiment of this invention will be described with reference to FIG. 7 and subsequent figures. FIG. 7 is an enlarged perspective view showing the construction of the magnetic head apparatus according to the first embodiment.

The arm-shaped head supporter 21 includes a head body portion 22, an arm portion 23, a fixed portion 24 and a plate-shaped spring member 29. The head body portion 22 has a recess portion thereon, and the magnetic head 27 is secured to the head body portion 22 while accommodated in the recess portion of the head body portion 22. The head body portion 22 further has a contact-slide portion 28 which is slid along the magneto-optical disc 1 in contact with the protection film side of the magneto-optical disc 1. The arm portion 23 is designed to have a taper portion which is formed such that the thickness thereof is gradually reduced toward the magnetic head 27, and so that the width thereof is also gradually reduced toward the tip thereof, and a flat portion which is formed to be continuous to the taper portion. The fixed portion 24 is provided with plural tapped holes 24b and 24c through which the head supporter 21 is secured to the link arm 16 with a screw 24a. The plate-shaped spring member 29 is designed in a slender form as a whole. One end side of the plate-shaped spring member 29 is designed in a substantial U-shape and is provided with branch portions 29a. The other end side of the spring member 29 is provided with plural holes at the positions corresponding to the tapped holes 24b and 24c. The head body portion 22, the arm portion 23 and the fixed portion 24 are formed of synthetic resin material, and these portions are secured to one another such that the plate-shaped spring member 29 is embedded in these portions. The branch portions 29a are formed integrally with the contact-slide portion 28 so as to surround the recess portion of the contact-slide portion 28.

The plate-shaped spring member 29 is exposed to the outside between the contact-slide portion 28 an the arm portion 23 to form a first elastic displacing portion 29b. In addition, the plate-shaped spring member 29 is exposed to the outside between the arm portion 23 and the fixed portion 24 to form a second elastic displacing portion 29d. The spring member 29 is slightly downwardly bent at the second elastic displacing portion 29d. The second elastic displacing portion 29d is designed to have a larger width than the first elastic displacing portion 29b, and the base end portion 29e in the fixed portion 24 is also designed to have a larger width than the second displacing portion 29d. In other words, the plate-shaped spring member 29 is designed so as to gradually narrowed from the base end side 29e toward the first elastic displacing portion 29b at the tip side thereof. Accordingly, the first displacing portion 29b is narrow, and thus the spring force and the elastic force thereof are weak. On the other hand, the second displacing portion 29d is wider, and thus the spring force and the elastic force is strong. The elastic force of the first elastic displacing portion 29b is weaker than the elastic force of the second displacing portion 29d. Accordingly, the contact-slide of the magnetic head 27 along the magneto-optical disc 1 is performed mainly by the second elastic displacing portion 29d. On the other hand, a follow (tracing) operation of the contact-slide portion 29 to a minute displacement or a minute vibration in a direction perpendicular to the surface of the magneto-optical disc 1, that is, in a vertical direction to the surface of the magneto-optical disc 1 is performed by the first elastic displacing portion 29b. That is, the first elastic displacing portion 29b plays a role in absorption of the vertical vibration of the magneto-optical disc 1. Suitable material for the plate-shaped spring member 29 includes stainless steel, beryllium bronze or phosphor bronze, and any insulating material having elasticity.

A flexible print board 30 is adhesively attached on the surface of the head supporter 21 over the head body portion 22, the arm portion 23 and the fixed portion 24. The flexible print board 30 serves to supply a driving current based on recording data from the head driving circuit 41 to the magnetic head 27 through terminal portions 30d at the other end side of the flexible print board 30. As described later, the terminal portions 30a at the one end side of the flexible print board 30 are connected to the magnetic head 27. The terminal portions 30d and the terminal portions 30a are connected to each other through wirings 30c.

Figure 9:
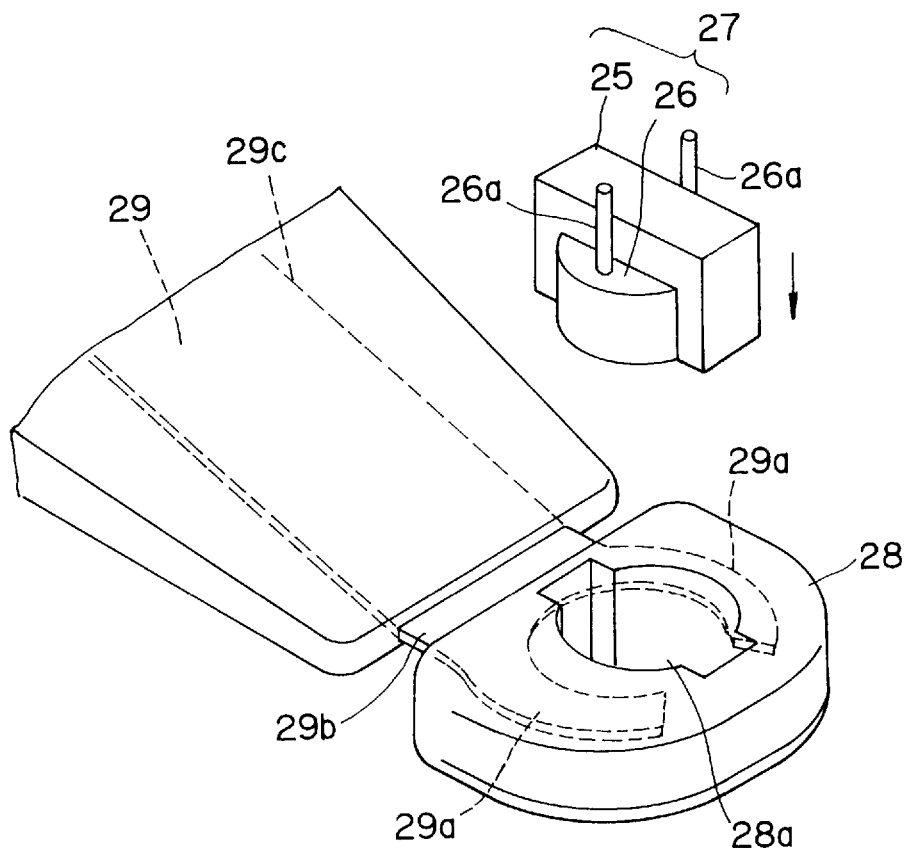
FIG. 9 is an exploded perspective view showing a method of securing the magnetic head.
Figure 10:
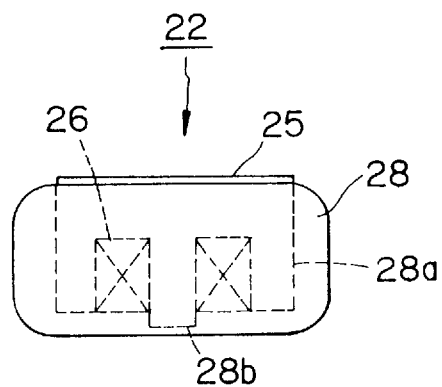
FIG. 10 is a front view of a contact-slide portion.

A shown in FIGS. 9 and 10, the magnetic head 27 includes a core 25 which is designed in an E-shaped section and comprises a center magnetic pole core and a side magnetic pole core, a coil 26 wound around the center magnetic pole of the core 25. The terminal portions 26a of the coil 26 are connected to the terminal portions 30a of the flexible print board 30 with soldering.

Figure 8:
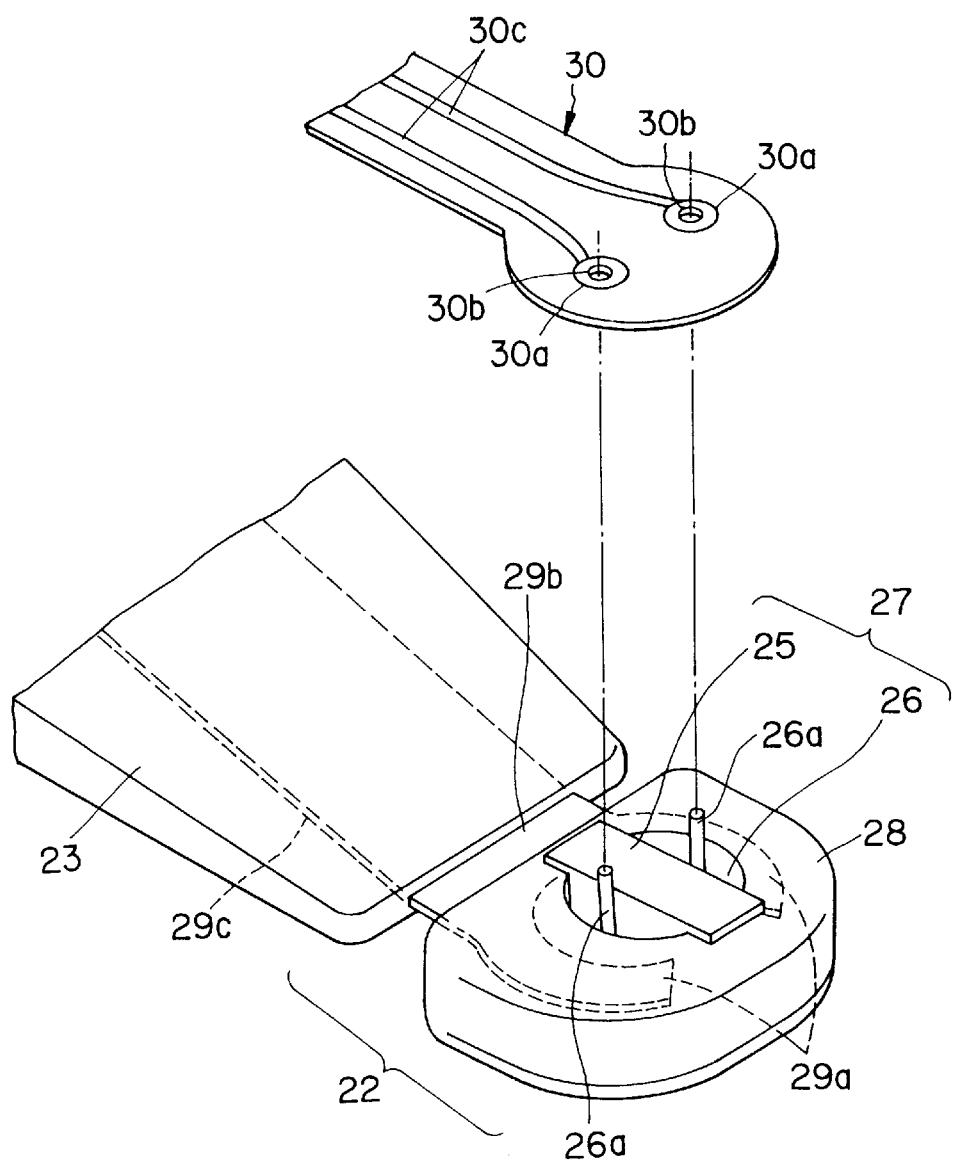
FIG. 8 is an exploded perspective view showing a method of securing a flexible print board to the magnetic head.

FIG. 8 is an enlarged exploded perspective view of the magnetic head 27 of FIG. 7. A manner of connecting the terminal portions 30a of the flexible print board 30 to the terminal portions 26a of the magnetic head 27 will be described with reference to FIG. 8. The terminals 30a at the tip side of the wirings 30c of the flexible print board 30 are provided with holes 30b. The terminals 26a of the coil 26 are inserted into the holes 30b, and these terminals 26a and the holes 30b are jointed to each other with soldering, for example.

FIG. 9 is another enlarged exploded perspective view of the magnetic head 27 of FIG. 7. A manner of securing the magnetic head 27 to the contact-slide portion 22 will be described with reference to FIG. 9. The terminals 26a are engagedly inserted into the recess portion 28a of the contact-slide portion 28 with the terminals 26a faced up in FIG. 9 so that the longitudinal direction of an E-type core 25 is coincident with the radial direction of the magneto-optical disc 1.

FIG. 10 is a side view of the head support portion 22. The recess portion 28a of the contact-slide portion 28 is designed in such a bind-hole shape as to be extremely thin at the bottom portion thereof, and a portion of the bottom surface portion 28b which faces the center magnetic pole of the core 25 of the magnetic head 27 is designed to be further thinner than the other portions, and it is designed to be 0.1 mm in thickness, for example.

Figure 11:
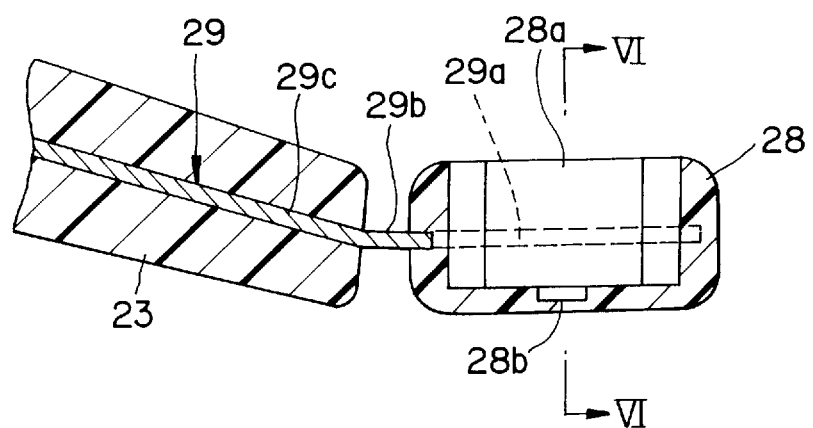
FIG. 11 is a cross-sectional view showing a part of a contact-slide portion and an arm portion, and is a cross-sectional view which is taken along a line V—V line of FIG. 12 as described below.
Figure 12:
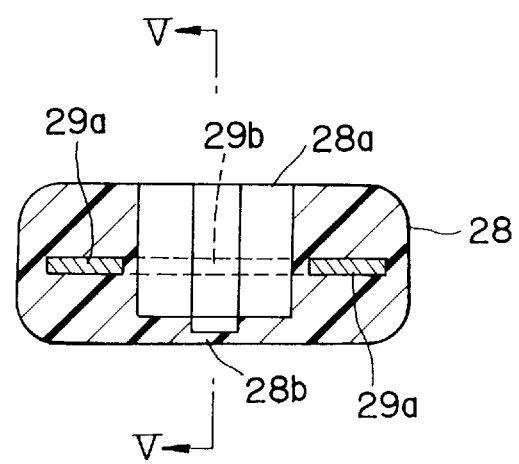
FIG. 12 is a cross-sectional view which is taken along a line VI—VI of FIG. 11.

FIGS. 11 and 12 show a state before the magnetic head 27 is secured to the contact-slide portion 28. As shown in the figures, the plate-shaped spring member 29 is slightly upwardly bent at the first elastic displacing portion 29b so that the lower surface of the contact-slide portion 28 is parallel to the surface of the magneto-optical disc 1.

As described above, the second elastic displacing portion 29d having relatively large elastic force and the first elastic displacing portion 29b having relatively small elastic force are provided, whereby the contact-slide of the contact-slide portion 28 along the magneto-optical disc 1 can be surely performed, and the frictional force between the magneto-optical disc 1 and the contact-slide portion 28 can be reduced to prevent the magneto-optical disc 1 from being damaged. Further, when the head supporter 21 is formed integrally with the contact portion and the arm portion which are formed of the plate-shaped spring member 29 and synthetic resin, the weight can be reduced with obtaining a suitable rigidity.

The plate-shaped spring member 29 is exposed at the first and second elastic displacing portions 29b and 29d to the outside at a position below the top surfaces of the contact-slide portion 28, the arm portion 23 and the fixed portion 24 between the contact-slide portion 28 and the arm portion 23 and between the arm portion 23 and the fixed portion 24. The other portion of the plate-shaped spring member 29 is embedded into the contact-slide portion 28, the arm portion 28 and the fixed portion 24. Accordingly, an accident such as leakage or short-circuit due to the contact of the flexible print board 30 with the plate-shaped spring member 29 can be avoided.

The plate-shaped spring member 29 is made integral with the contact-slide portion 28, the arm portion 23 and the fixed portion 24 using a so-called insert molding in a state where it is embedded into the contact-slide portion 28, the arm portion 23 and the fixed portion 24.

Figure 13:
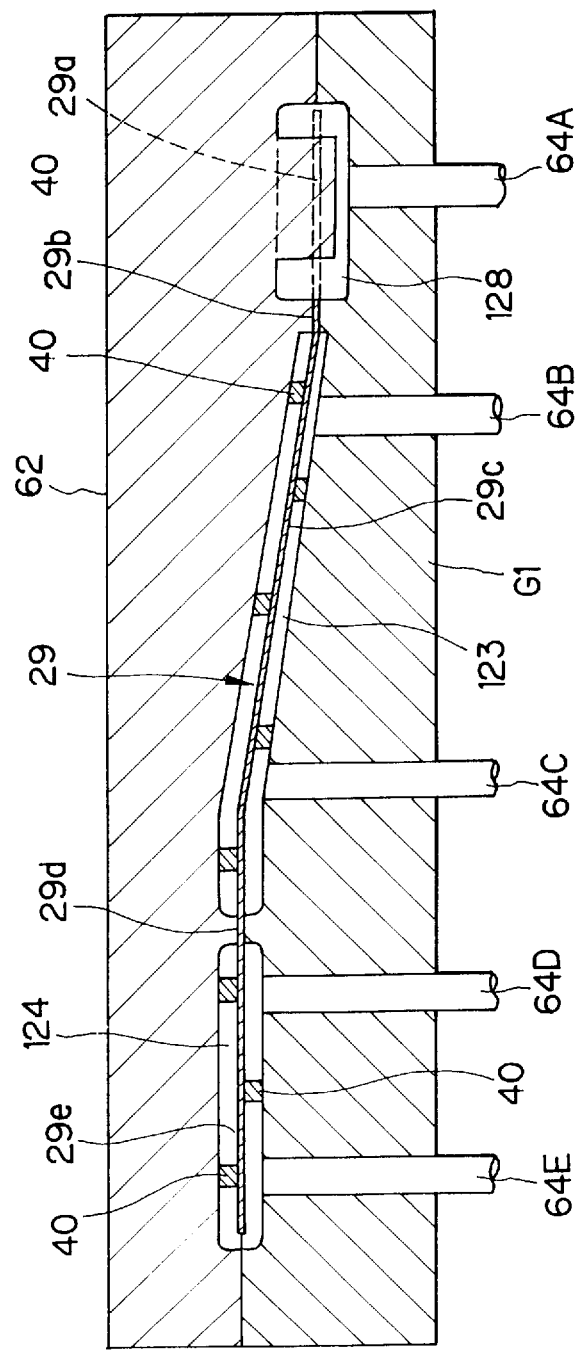
FIG. 13 is a cross-sectional view showing a mold for forming a head supporter of the magnetic head apparatus according to the first embodiment.
Figure 14:
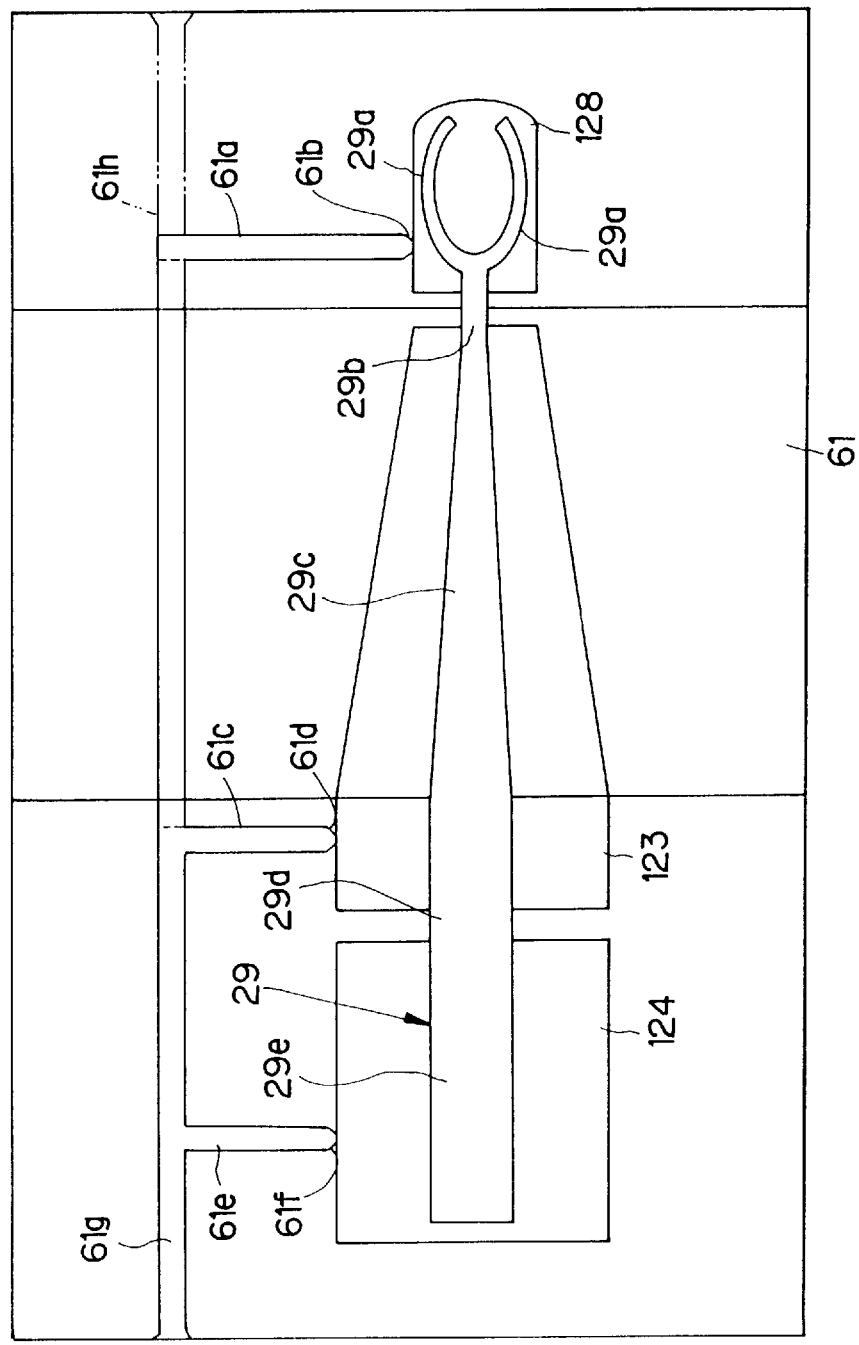
FIG. 14 is a plan view of the mod shown in FIG. 12.

FIG. 13 is a cross-sectional view of a mold which is used for the insert molding process, and FIG. 14 is a plan view showing a state where the plate-shaped spring member 29 is set. The mold and the insert molding method will be described with these figures.

The mold comprises a female mold 61 and a male mold 62, and a cavity which is defined by the male and female molds 61 and 62 and is formed to be coincident with the curved shape of the plate-shaped spring member 29. The cavity comprises a cavity 128 for molding the contact-slide portion, a cavity 123 for molding the arm portion and a cavity 124 for molding the fixed portion. The mating faces of the male and female molds 61 and 62 are formed along the center in the thickness direction of the plate-shaped spring member 29 sandwiched between the male and female molds 61 and 62. The contact-slide portion molding cavity 128 and the arm portion molding cavity 123 are separated from each other at the position corresponding to the first elastic displacing portion 29d in a state where the plate-shaped spring member 29 is sandwiched between the male and female molds 61 and 62, and the arm portion molding cavity 123 and the fixed portion molding cavity 124 are separated from each other at the position corresponding to the second elastic displacing portion 29d. A plurality of extruding pins 64A, 64B, 64C, 64D and 64E are provided at the positions corresponding to the contact-slide molding cavity 128 of the female mold 61, the arm portion molding cavity 123 and the fixed portion molding cavity 124. At the time when, after an injection molding process, the resin is hardened, the contact-slide portion 28, the arm portion 23 and the fixed portion 24 are extruded from the female mold 61 by the extruding pins 64A, 64B, 64C, 64D and 64E, thereby separately molding the head supporter 21.

When the head supporter 21 is molded, the plate-shaped spring member 29 is first set in the female mold 61, and the male mold 61 is closed to pinch the plate-shaped spring member 29 at the positions corresponding to the first and second elastic displacing portions 29b and 29d by the male and female molds 61 and 62. At this time, the contact-slide portion molding cavity 128 and the arm portion molding cavity 123 are separated from each other at the position corresponding to the first elastic displacing portion 29b as described above, and the arm portion molding cavity 123 and the fixed portion molding cavity 124 are separated from each other at the position corresponding to the second elastic displacing portion 29d. At this time, plural resin pieces 40 are disposed between the plate-shaped spring member 29 and the inner surface of each of the contact-slide portion molding cavity 128, the arm portion molding cavity 123 and the fixed portion molding cavity 124 so that the plate-shaped spring member 29 is horizontally supported in each cavity. In addition, when melted resin is injected into and filled in each cavity, the plate-shaped spring member 29 is prevented from being floated from its horizontal state in each cavity or from being positionally deviated (for example, downwardly moved) due to the pressure of the injected resin. The material of the resin pieces 40 is identical to that of the resin which is injected into and filled in the cavities 128, 123 and 124.

Thereafter, the melted resin is injected from a nozzle (not shown) to a spool 61g which is provided to the female mold 61. The melted resin injected to the spool 61g is injected through runners 61a, 61c and 61e and gates 61b, 61d nd 61f to each of the cavities 128, 123 and 124, and filled in each of the cavities 128, 123 and 124. Through this process, in each of the cavities 128, 123 and 124, the branch portions 29a of the plate-shaped spring member 29, the inner portion 29c of the arm portion 23 and the inner portion 29e of the fixed portion 24 are embedded in the contact-slide portion 28, the arm portion 23 and the fixed portion 24 shown in FIG. 7, the unified into one body. As described above, the plural pieces 40 are formed of the same material as the contact-slide portion 28, the arm portion 23 and the fixed portion 24, and thus it is integral with the contact-slide portion 28, the arm portion 23 and the fixed portion 24.

After the resin injected into the filled in each of the cavities 128, 123 and 124 is hardened, the male mold 62 and the female mold 61 are opened, and then the extruding pins 64A, 64B, 64C, 64D and 64E are upwardly moved in FIG. 13 to extrude the contact-slide portion 28, the arm portion 23 and the fixed portion 24 which are molded in the cavities 128, 123 and 124 respectively and separate these portions from the female mold 61. Subsequently, the resin filled in the runners 61a, 61c, 61e is cut at the positions corresponding to the gates 61b, 61d, 61f to produce the head supporter 21 shown in FIG. 7.

The material for the contact-slide portion 28 is required to have various characteristics such as high dimension precision, high heat resistance, high abrasion resistance, light weight, etc. Materials the meet these requirements include polyphenylene sulfide (PPS), polyacetal (POM), polyarete (PAR), polyimide 6 (nylon 6), polyamide 66 (nylon 66), polyethylene terephthalate (PET), ultra-high molecular polyethylene (UHMW-PE), high-molecular polyethylene (HMW-PE), acrylonitrile/butadiene/styrene copolymer (ABS) or the like. Further, ABS or the like may be used as material for the arm portion 23 and the fixed portion 24.

When the contact-slide portion 28 and both of the arm portion 23 and the fixed portion 24 are formed of different materials, as shown by an imaginary line of FIG. 14, the spool 61g is designed in a short length so as to penetrate through only the runners 61c and 61e, and another spool 61h which penetrates through only the runner 61a is provided. The spools 61g and 61h are supplied with different kinds of melted resins. Through this process, the contact-slide portion 28 can be formed of resin material meeting the requirement as described above while the arm portion 23 and the fixed portion 24 are formed of inexpensive resin material, so that the cost of the materials can be reduced.

The magnetic head apparatus according to a second embodiment of the invention will be next described with reference to FIG. 15. The same elements as the first embodiment are represented by the same reference numerals, and the detailed description thereof is omitted from the following description.

Figure 15:
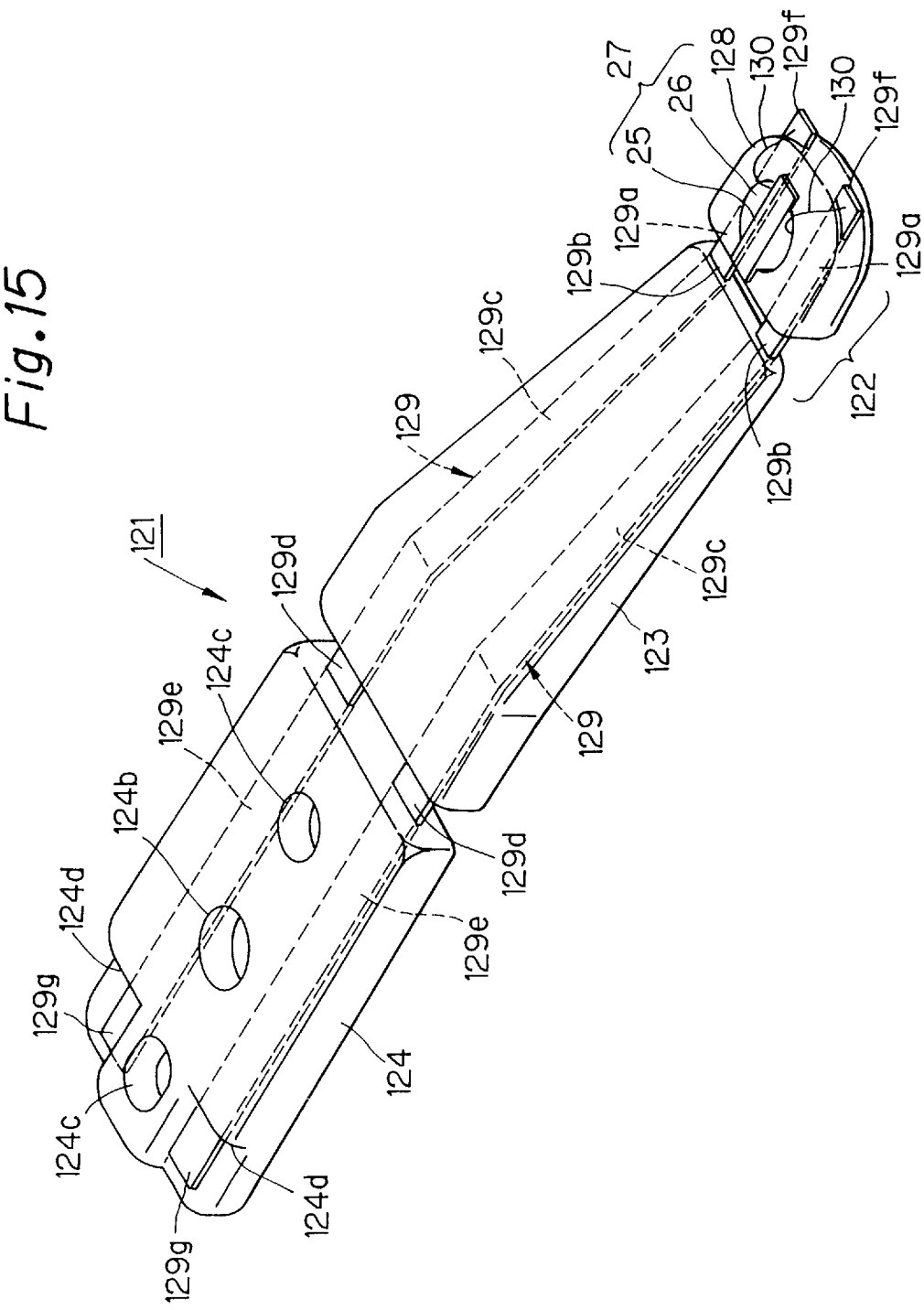
FIG. 15 is a perspective view showing the construction of a magnetic head apparatus according to a second embodiment of this invention.

As shown in FIG. 15, an arm-shaped head supporter 121 is equipped with two plate-shaped spring members 129 which are disposed in parallel to each other so as to sandwich the magnetic head 27 therebetween. At a halfway portion of the arm portion 123, that is, at a halfway portion of a portion 129c embedded into the arm portion 123, these plate-shaped spring members 129 are slightly bent in such a direction that the magnetic head 27 is contacted with the magneto-optical disc 1. Further, the portions 129a of the two plate-shaped spring members 129 which are embedded in a main body portion 122 at the tip side are slightly bent at a first elastic displacing portion as described later so that the contact-slide portion 128 of the main body 122 is parallel to the surface of the magneto-optical disc 1. These plate-shaped spring members 129 are formed of material having elasticity and conductivity, such as beryllium copper, phosphor bronze or other copper alloy.

The two plate-shaped spring members 129 are embedded in the fixed portion 124, the arm portion 123 and the main body portion 122 over these portions. The tip portions 129f of these two plate-shaped spring members 129 are projected from the main body portion 122, and the other end portions 129g are exposed through cut-out portions 124d which are formed at the base end side of the fixed portion 124. The tip end portions 129f are electrically connected to the end portions 130 of the coil 26 of the magnetic head 27 by soldering. The tip end portions 129f function as terminals for electrically connecting the spring members 129 to the coil 26. Further, the other end portions 129g function as input terminals for receiving a driving signal from the head driving circuit 41, and are electrically connected to a wiring from the magnetic head driving circuit 41. The two plate-shaped spring members 129 are exposed to the outside between the fixed portion 124 and the arm portion 123 and between the arm portion 123 and the main body portion 122 like the first embodiment, thereby forming the first elastic displacing portion 129b and the second elastic displacing portion 129d.

The fixed portion 124, the arm portion 123 and the contact-slide portion 128 are formed of the same synthetic resin material as the first embodiment. The fixed portion 124 is provided with plural tapped holes 124c and 124b through which it is secured to a link arm 16, and is provided with a pair of cut-out portions 124d at the base end side as described above. The base end sides 129e of the two plate-shaped spring members 129 are embedded in the fixed portion 124. Like the first embodiment, the arm portion 123 comprises a taper portion and a flat portion which is continuous to the taper portion, and it is designed to be gradually narrowed toward the tip thereof. The main body portion 122 has a contact-slide portion 128 which is formed with a recess portion for accommodating the magnetic head 27.

In the second embodiment, the plate-shaped spring members 129 are disposed substantially in parallel to each other so as to sandwich the magnetic head 27 therebetween, and thus the plate-shaped spring member which is narrower than the first embodiment is used in a state where the rigidity in the rotational direction of the magneto-optical disc 1 is kept, so that the elastic urging force of the first and second elastic displacing portions 129b and 129d can be weakened. In addition, a load force can be easily balanced at the right and left sides, and the contact-slide resistance of the magnetic head 27 can be set to a suitable value. Even when a pressure which is caused by an up-and-down motion of the magneto-optical disc 1 due to the warp of the disc 1 or the like is applied to the head supporter 121, a torsion phenomenon (rolling phenomenon) can be prevented from occurring in the head supporter 121.

By forming the two plate-shaped spring members 129 with the material having conductivity, the spring members 129 can be also used as a wiring member for supplying an electrical signal to the magnetic head 27, and thus no wiring process of the head supporter 121 is required. In addition, since an effect of the elastic force inherent to the wiring member, that is, a reaction force of the wiring member can be offset and the rotational force induced due to the torsion of the wiring member is not applied to the head supporter 121, no torsion occurs in the attitude of the magnetic head 27. Accordingly, the magnetic head 27 can be kept in a horizontal (parallel) attitude to the magneto-optical disc 1. Further, by setting a larger interval between the two plate-shaped spring members 129, a torsion occurring in the head supporter 121 can be also prevented. Like the first embodiment, in the head supporter 121 of the second embodiment, the two plate-shaped spring members 129 can be formed integrally with the arm portion 123, the fixed portion 124 and the contact-slide portion 128 by the insert molding process.

Next, the magnetic head apparatus according to a third embodiment of the invention will be described with reference to FIGS. 16 to 18. The common elements to the first and second embodiments are represented by the same reference numerals as the first and second embodiments, and the detailed description thereof is omitted.

Figure 16:
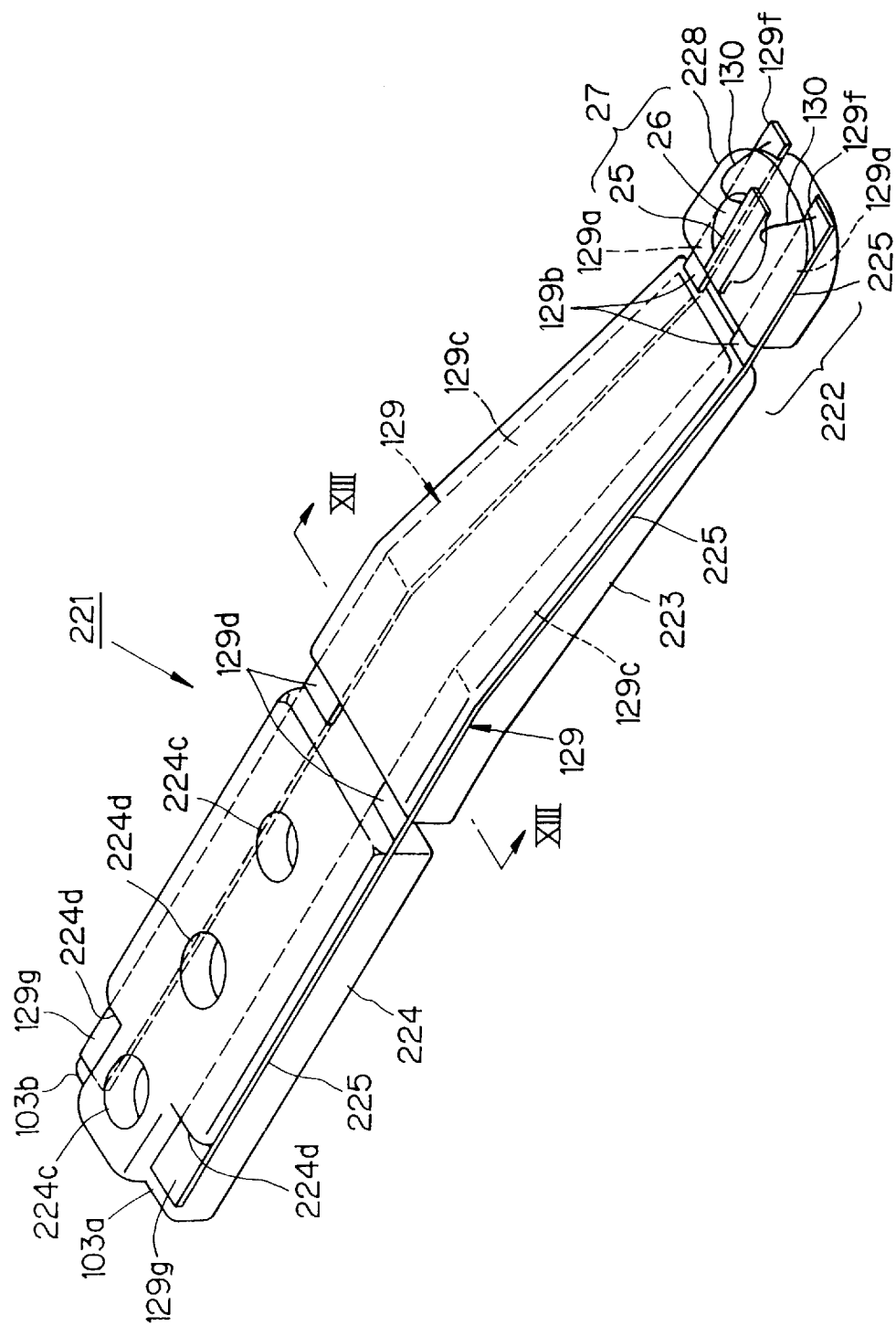
FIG. 16 is a perspective view showing the construction of a magnetic head apparatus according to a third embodiment of this invention.

FIG. 16 is a perspective view showing the magnetic head apparatus of the third embodiment according to this invention.

A fixed portion 224, an arm portion 223 and a contact-slide portion 228 which constitute an arm-shaped head supporter are formed of the same synthetic resin materials as the first embodiment, respectively. The fixed portion 224 are provided with plural tapped holes 224c and 224b which are used to secure the fixed portion 224 to the link arm 16, and also provided with a pair of cut-out portions 224d at the base end side thereof. The other end portions 129g of the two plate-shaped spring members 129 are exposed to the outside. The base end sides 129e of the two plate-shaped spring members 129 are embedded into the fixed portion 224. Like the first embodiment, the arm portion 123 includes a taper portion and a flat portion which is continuous to the taper portion, and it is designed to be gradually narrower toward the tip thereof. A main body portion 222 has a contact-slide portion 228 with a recess portion for accommodating the magnetic head 27.

On both side surfaces of each of the fixed portion 224, the arm portion 223 and the contact-slide portion is formed a groove 225 whose depth is equal to the width of the plate-shaped spring members 129 and whose width is slightly smaller than the thickness of the plate-shaped spring members 129. As shown in FIG. 18, each of the grooves 225 is disposed substantially at the center in the thickness direction on both side surfaces of each of the fixed portion 224, the arm portion 223 and the contact-slide portion 228. In this state, each of the fixed portion 224, the arm portion 223 and the contact-slide portion 228 are formed by the injection molding process.

Figure 17:
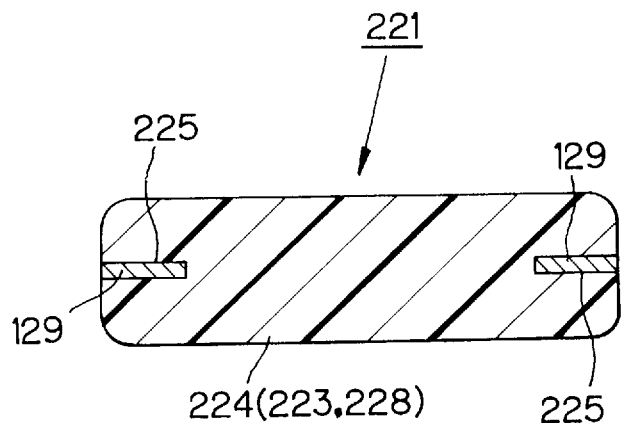
FIG. 17 is a cross-sectional view which is taken along a line VIII—VIII of FIG. 16.
Figure 18:
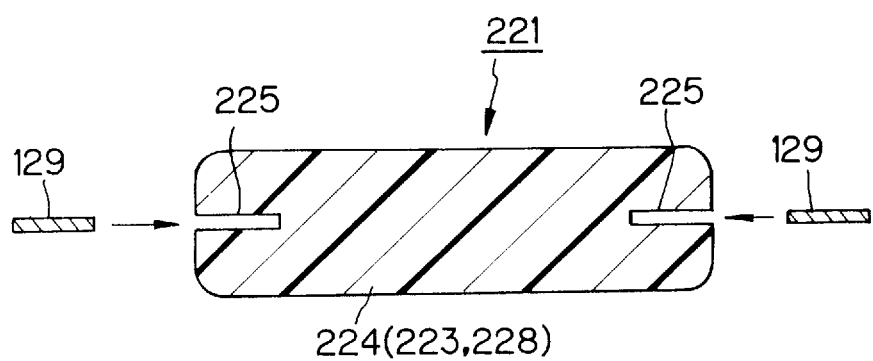
FIG. 18 is a cross-sectional view showing a method of securing a plate-shaped spring member.

Thereafter, as shown in FIGS. 17 and 18, the two plate-shaped spring members 129 are inserted into each groove 225 under pressure to secure the two plate-shaped spring members 129 to the fixed portion 224, the arm portion 223 and the contact-slide portion 228.

As described above, according to the third embodiment, the plate-shaped spring members are not formed integrally with the fixed portion, the arm portion and the contact-slide portion as shown in the first and second embodiments, but the fixed portion 224, the arm portion 223 and the contact-slide portion 228 are beforehand formed by the injection molding process and then the plate-shaped spring members 129 are press-fit to the fixed portion 224, the arm portion 223 and the contact-slide portion 228. Therefore, in the third embodiment, the fixed portion, the arm portion and the contact-slide portion can be simply molded.

In the magnetic head apparatuses of the first, second and third embodiments as described above, the first and second elastic displacing portions are provided to perform the contact-slide of the magnetic head 27 along the surface of the magneto-optical disc 1. In addition to these first and second elastic displacing portions, a third elastic displacing portion may be used.

Figure 19:
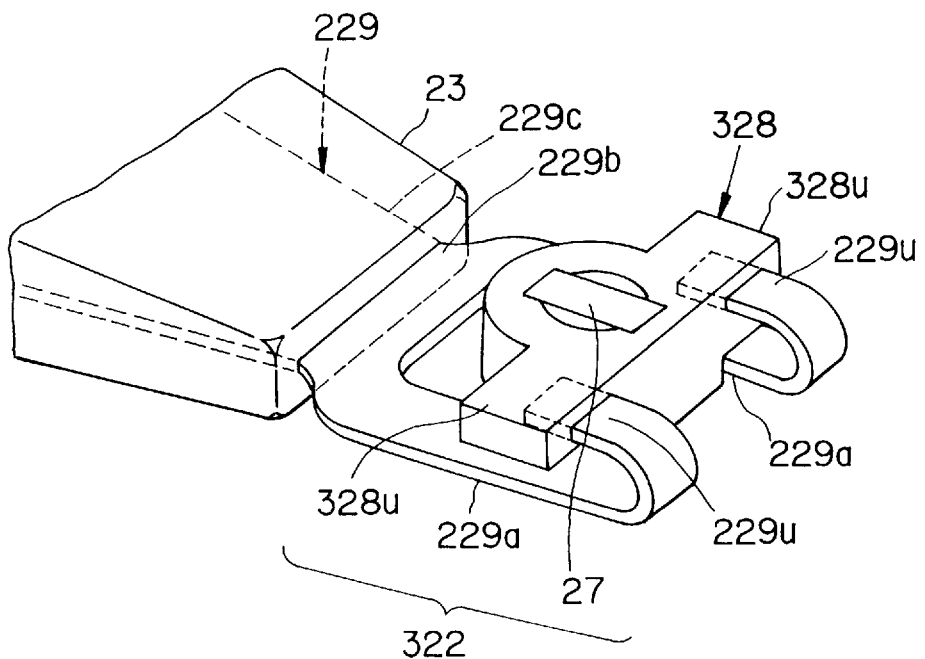
FIG. 19 is an enlarged perspective view of a main part of a magnetic head apparatus of a fourth embodiment of this invention.

The magnetic head apparatus having the third elastic displacing portion according to a fourth embodiment of this invention will be described with reference to FIG. 19. The fourth embodiment is basically designed in the same construction as the first embodiment, except for the construction of a plate-shaped spring member 229 and a main body portion 322, and the following description is concentrically made on the different points.

Figure 20:
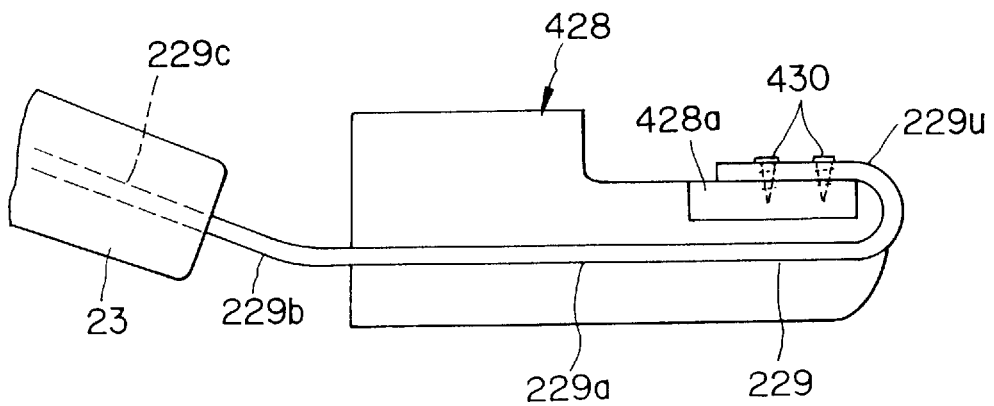
FIG. 20 is an enlarged cross-sectional view showing the construction of a magnetic head apparatus of a fifth embodiment according to this invention.

The tip of the first elastic displacing portion 229 of the plate-shaped spring member 229 constituting the arm-shaped supporter is designed to be slightly wider from the portion 229c embedded in the arm portion 23, and is provided with a pair of branch portions 229a whose combination is substantially U-shaped on a horizontal plane. The tip portion of each of the branch portions 229a is folded to have a substantially U-shaped section as shown in FIG. 20, thereby forming bent portions 229u. These bent portions 229u function as the third elastic displacing portion. The elastic force of the bent portions 229u is set to be further weaker than that of the first elastic displacing portion 229. The other portion of the plate-shaped spring member 229 is designed in the same construction as the plate-shaped embodiment of the first spring member 29.

The main body portion 322 has a contact-slide portion 328 to which the magnetic head 27 is secured. The contact-slide portion 328 is provided with a pair of projection portions 328u which are disposed at both sides of the contact-slide portion so as to sandwich the magnetic head 27 therebetween. The bent portions 229u are secured to the projection portions 328u by an integral molding or a press fitting. The lower surface of the contact-slide portion 328 is kept substantially in parallel to the surface of the magneto-optical disc 1 in a state where the bent portions 229u are secured to the projection portions 328u.

In the fourth embodiment, like the second elastic displacing portion 29d of the first embodiment, the second elastic displacing portion is provided at the base end side of the head supporter. In addition, the first elastic displacing portion 229 is provided at the free end side of the head supporter, and the bent portions 229u serving as the third elastic displacing portion are provided at the tip side of the first elastic displacing portion 229. As a result, the main body portion 322 can accurately follow fluctuation and vibration in the up-and-down direction of the magneto-optical disc 1, and the frictional force between the main body portion 322 and the magneto-optical disc 1 can be reduced.

In the fourth embodiment, the bent portions 229u are secured to the projection portions 328u by the insert molding or the press-fitting process. However, the securing method is not limited to the above methods, and these elements may be fixed to each other by screws.

The magnetic head apparatus using the above securing method (using screws) according to fifth embodiment of the invention will be described with reference to FIG. 20. The same elements as the fourth embodiment are represented by the same reference numerals.

In FIG. 20, the contact-slide portion 428 constituting the arm-shaped supporter is provided with a securing portion 429 which is disposed nearer to the tip end side than a portion to which the magnetic head 27 is secured. The upper surface of the securing portion 429 is disposed at a position which is lower by one step than the portion of the contact-slide portion 428 to which the magnetic head 27 is secured, and a pair of projection portions 428a are formed at both sides of the securing portion 429 so as to sandwich the magnetic head 27 therebetween. One of the projection portions 428a is not shown in FIG. 20. Each bent portion 229u of the plate-shaped spring member 229 is secured to the upper surface portion of each of the projection portions 428a by plural tapping screws 430. In the fifth embodiment, the securing process of the bent portions 229u to the contact-slide portion 428 can be facilitated.

Next, the magnetic head apparatus of a sixth embodiment of the invention will be described with reference to FIG. 21. The same elements as each of the first to fifth embodiments as described above are represented by the same reference numerals, and the detailed description thereof is omitted.

Figure 21:
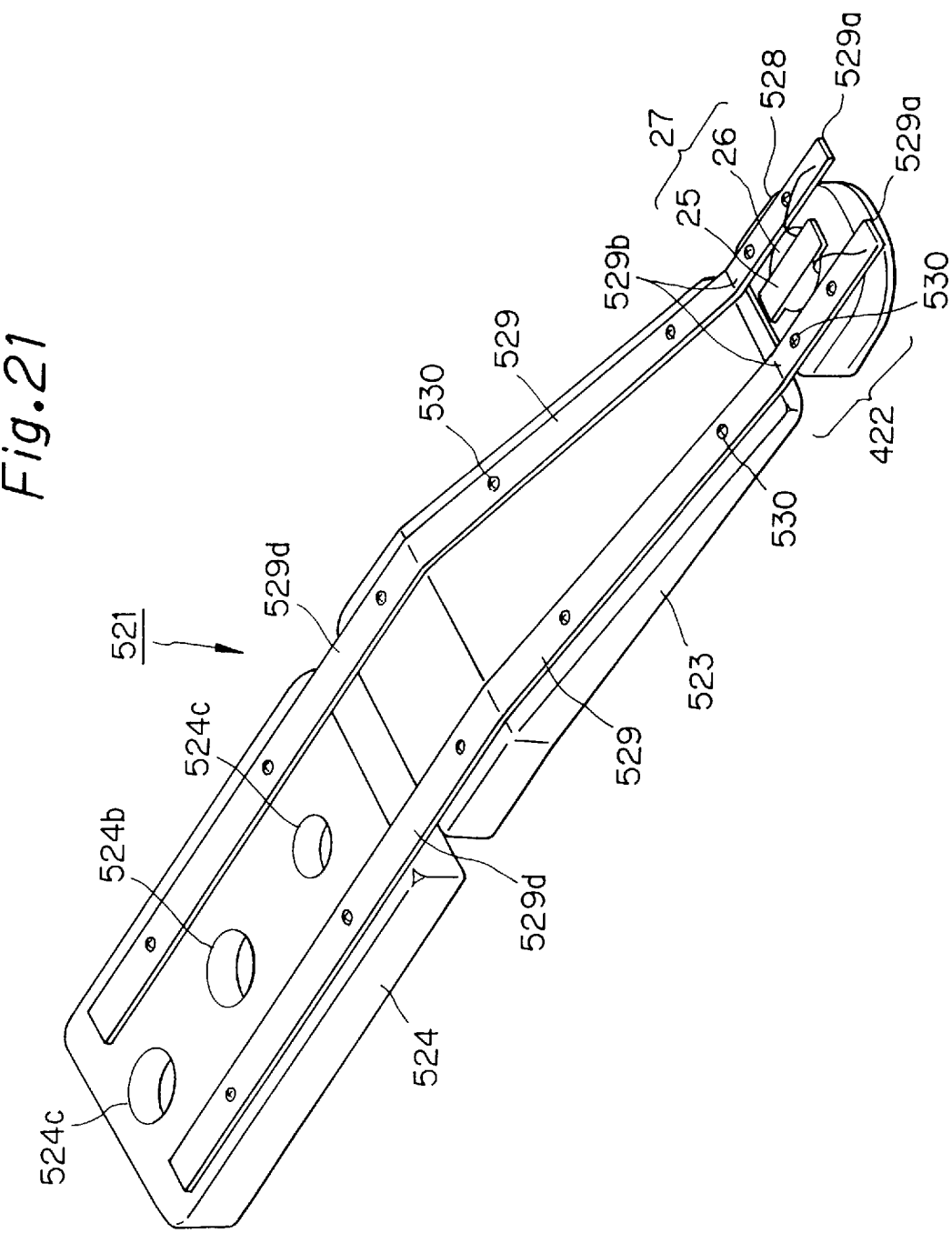
FIG. 21 is a perspective view showing the construction of a magnetic head apparatus of a sixth embodiment according to this invention.

As shown in FIG. 21, an arm-shaped head supporter 521 is provided with two plate-shaped spring members 529 which are disposed substantially in parallel to each other so as to sandwich the magnetic head 27 therebetween. At a halfway portion of the arm portion 523, these plate-shaped spring members 529 are slightly bent in such a direction that the magnetic head 27 is contacted with the magneto-optical disc 1, and the portions 529a of the spring members 529 which are secured to a main body portion 522 at the tip side thereof are slightly bent at a position corresponding to a first elastic displacing portion as described later so that the contact-slide portion 528 is substantially parallel to the surface of the magneto-optical disc 1. These plate-shaped spring members 529 are formed of material having elasticity and conductivity, such as beryllium copper, phosphor bronze or other copper alloy.

In FIG. 21, the two plate-shaped spring members 529 are secured to and over the upper surfaces of the fixed portion 524, the arm portion 523 and the main body portion 522 through plural tapping screws 530 so that these spring members are disposed in parallel to each other so as to sandwich the magnetic head 27 therebetween. The tip portions of the two plate-shaped spring members 529 are electrically connected to the coil 26 of the magnetic head 27 by a soldering or the like, and the base end portions of the spring members 529 are electrically connected to the head driving circuit 41 by a wiring member or the like.

The fixed portion 524, the arm portion 523 and the contact-slide portion 528 are formed of the same synthetic resin materials as the first embodiment. The fixed portion 524 is provided with plural tapped holes 524c through which it is fixed to the link arm 56. Like the first embodiment, the arm portion 523 includes a taper portion and a flat portion which is continuous to the taper portion, and it is designed to be gradually narrowed toward the tip thereof. The main body portion 522 has a contact-slide portion 528 with a recess portion for accommodating the magnetic head 27.

In the sixth embodiment, the securing work of the two plate-shaped spring members 529 to the fixed portion 524, the arm portion 523 and the main body portion 522 is facilitated.

The lower surface of the contact-slide portion of each embodiment as described above is formed like the flat surface as shown in FIG. 10. In the contact-slide portion having such a lower surface, the frictional resistance occurring between the lower surface of the contact-slide portion and the surface of the magneto-optical disc becomes larger.

Figure 22:
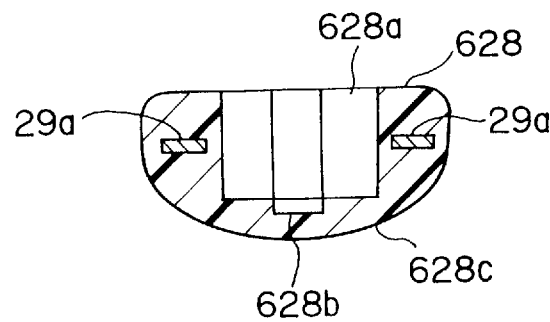
FIG. 22 is an enlarged cross-sectional view of a main part of a magnetic head apparatus of a seventh embodiment according to this invention.

FIG. 22 shows the construction of the contact-slide portion of the magnetic head apparatus of a seventh embodiment of this invention in which the above problem is solved.

In FIG. 22, a contact-slide portion 628 constituting the arm-shaped head supporter is formed of synthetic resin material like the first embodiment, and it is provided with a recess portion 628a in which the magnetic head 27 is secured and accommodated. The contact-slide portion 628 has a substantially flat upper surface is and a circular-arc contact-slide surface 628c which is slid on the magneto-optical disc 1 in contact with the surface of the magneto-optical disc 1. The bottom surface portion 628b of the recess portion 628a which faces the center magnetic pole of the magnetic head 27 is designed to be thinner than the other portions. By designing the contact-slide surface 628c in a circular-arc form, the magneto-optical disc 1 and the contact-slide portion 628 are contacted with each other on a line, at a point or in a similar state. Therefore, the frictional force between the contact-slide portion 628 and the magneto-optical disc 1 can be reduced.

Next, the magnetic head apparatus according to an eighth embodiment of this invention will be described with reference to FIG. 23. The eighth embodiment of this invention has basically the same construction as the first embodiment. The same elements as the first embodiment are represented by the same reference numerals, and the detailed description of this embodiment will be made with quotation of the description of the first embodiment.

Figure 23:
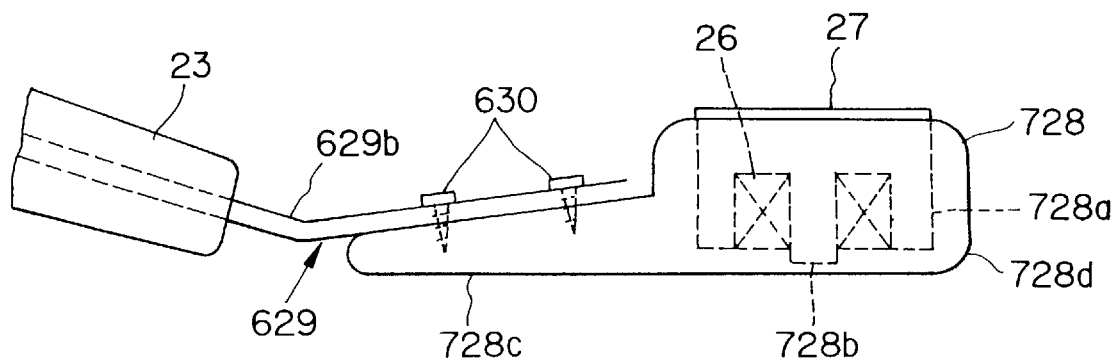
FIG. 23 is an enlarged side view showing the construction of a magnetic head apparatus of an eighth embodiment according to this invention.

In FIG. 23, the tip side of a plate-shaped spring member 629 is upwardly bent at a position corresponding to a first elastic displacing portion 629b. The tip portion of the plate-shaped spring member 629 is provided with plural holes through which the spring member 629 is secured to a contact-slide portion by plural tapping screws 630. The base end side of the plate-shaped spring member 629 is embedded in the arm portion 23 and the fixed portion 24. In the eighth embodiment, the number of the plate-shaped spring member(s) may be one or two.

A contact-slide portion 728 includes a head securing portion 728d to which the magnetic head 27 is secured, and a securing portion 728c which is secured to a plate-shaped spring member 629, and these portions 728d and 728c are formed of the same synthetic resin material as the first embodiment so as to be integral with each other. The lower surface of the contact-slide portion 728 is designed in a flat form. The head securing portion 728d is provided with a recess portion 728a in which the magnetic head 27 is engagedly secured. The bottom surface portion 728b of the recess portion 728a which faces the center magnetic pole of the magnetic head 27 is designed to be thinner than the other portions. The securing portions 728c is integrally formed with the head securing portion 728d so as to project from one side surface of the head securing portion 728d. The upper surface of the securing portion 728c is designed in a slant form, and a plate-shaped screw member 629 is secured to the slant surface by a screw 630.

The tip side of the plate-shaped spring member 629 thus formed is secured to the slant surface of the securing portion 728c of the contact-slide portion 728 with plural tapping screws 630.

As described above, in the eighth embodiment, the plate-shaped spring member 629 is formed integrally with the arm portion 23 and the fixed portion 24 by the insert molding process like the first embodiment, and then the contact-slide portion 728 which is formed of the different synthetic resin material from that of the arm portion 23 and the fixed portion 24 is secured to these portions 23 and 24. When the arm portion 23, the fixed portion 24 and the contact-slide portion 728 are molded with different synthetic resin materials like the first embodiment, a suitable device is required for the molds. However, the eighth embodiment does not require such a device, and the construction of a mold can be prevented from being complicated.

As described above, according to the eighth embodiment, various methods may be used to link the plate-shaped spring member to the contact-slide portion.

This invention is not limited to the above embodiments, and various modifications may be made without departing from the subject matter of this invention.

For example, other materials for molding the contact-slide portion may be used, for example, potassium titanate, carbon fiber, or a resin material containing carbon fiber as a filler. In this case, the friction between the contact-slide portion and the magneto-optical disc can be further reduced, and abrasion of the contact-slide portion or damage of the magneto-optical disc an be suppressed.

Further, in place of the magnetic head using the E-shaped core in which side magnetic poles are provided at both sides of the center magnetic pole, there may be used a magnetic head using a so-called barrel-shaped core which has a center magnetic pole and a side magnetic pole formed so as to surround the center magnetic pole.

The plate-shaped spring member is not limited to a specific one insofar as the first and second elastic displacing portions can be formed. For example, it may be adopted that two short plate-shaped spring members are used, and one spring member is disposed between the fixed portion and the arm portion to link the fixed portion to the arm portion while the other spring member is disposed between the arm portion and the contact-slide portion to link the arm portion to the contact-slide portion. In this case, like the first embodiment, the fixed portion, the arm portion and the contact-slide portion may be molded integrally with each plate-shaped spring member by the insert molding process.

Figure 24:
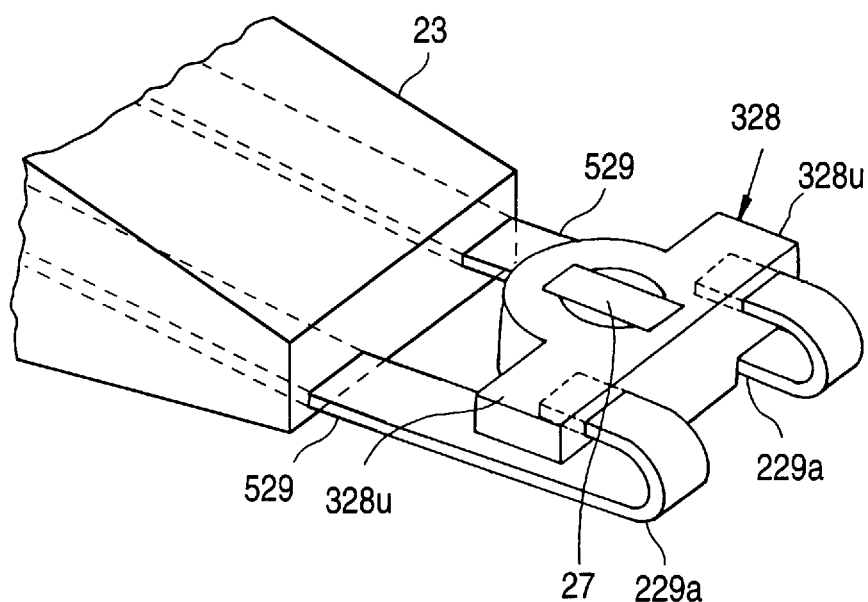
FIG. 24 is an enlarged perspective view of a main part of a magnetic head apparatus illustrating the branch portions with multiple plate-shaped spring members.

The fixed portion, the arm portion and the contact-slide portion may be formed in different shapes and of different materials from those of the embodiments as described above. Further, the branch portions 229a can be used in conjunction with two plate-shaped spring members, as illustrated in FIG. 24.

In the embodiments as described above, the description is made to the magneto-optical disc recording and/or reproducing apparatus using the magnetic-field modulation system, however, this invention is applicable to a magneto-optical disc recording and/or reproducing apparatus using an optical modulation system. In the optical modulation system, recording data are supplied to a light source for an optical pickup to irradiate the magneto-optical disc with a light beam which is on/off-operated on the basis of the recording data, and at the same time a DC perpendicular magnetic field is applied to the magneto-optical disc from the magnetic head to thereby perform a recording operation. Besides, this invention is applicable to a magnetic recording and/or reproducing apparatus using a magnetic recording medium such as a magnetic disc.

What is claimed is:

1. A magnetic head apparatus, comprising:
   a head body including a magnetic head unit and a contact-slide portion which is slid along a recording medium in contact with the surface of the recording medium while supporting said magnetic head unit; and
   arm-shaped support means for supporting said head body, wherein said arm-shaped support means includes:
   a pair of plate-shaped elastic members each of unitary construction and having a first and second end, two plate surfaces and two side surfaces that are narrower than said plate surfaces, said head body being linked to said first ends;

a first resin member sandwiching a first portion of each of said elastic members that is between said first ends and a mid portion of said elastic members, said first resin member spaced apart from said head body along said elastic members to defined first elastic displacing portions of said elastic members between said head body and said first resin member; and a second resin member sandwiching a second portion of each of said elastic members that is between said mid portions and said second ends, said second resin member spaced apart from said first resin member along said elastic members to define second elastic displacing portions of said elastic members between said first and second resin members;

wherein the first ends of said elastic members form substantially U-shaped elastic displacing portions where the first ends of the elastic members bend back upon themselves so that one of the two plate surfaces faces itself, and said head body is secured to a free end side of said U-shaped elastic displacing portions while a base end side of said U-shaped elastic displacing portions are linked to said first elastic displacing portions.

* * * * *

UNITED STATES PATENT AND TRADEMARK OFFICE
CERTIFICATE OF CORRECTION

PATENT NO.: 5,822,154
DATED: October 13, 1998
INVENTOR(S): TOMOYUKI TAKAHASHI ET AL.

It is certified that an error appears in the above-identified patent and that said Letters Patent is hereby corrected as shown below:

On the title page item [57],

In the Abstract, line 17, after "the other end" remove the words "portion has one end secured to the fixed member and the other end".

Signed and Sealed this

Thirtieth Day of March, 1999

Attest:

Q. TODD DICKINSON

Attesting Officer

Acting Commissioner of Patents and Trademarks